(12) United States Patent
Bosshart et al.

(10) Patent No.: US 10,104,004 B2
(45) Date of Patent: Oct. 16, 2018

(54) OPENFLOW MATCH AND ACTION PIPELINE STRUCTURE

(71) Applicant: Texas Instruments Incorporated, Dallas, TX (US)

(72) Inventors: Patrick W. Bosshart, Plano, TX (US); Hun-Seok Kim, Dallas, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 0 days.

(21) Appl. No.: 14/072,989

(22) Filed: Nov. 6, 2013

(65) Prior Publication Data

US 2014/0334489 A1    Nov. 13, 2014

Related U.S. Application Data

(60) Provisional application No. 61/724,105, filed on Nov. 8, 2012.

(51) Int. Cl.
*H04L 12/875*    (2013.01)
*H04L 12/741*    (2013.01)
*H04L 29/06*     (2006.01)
*H04L 12/707*    (2013.01)

(52) U.S. Cl.
CPC ............ *H04L 47/56* (2013.01); *H04L 45/745* (2013.01); *H04L 45/24* (2013.01); *H04L 69/22* (2013.01)

(58) Field of Classification Search
None
See application file for complete search history.

(56) References Cited

U.S. PATENT DOCUMENTS

| | | | |
|---|---|---|---|
| 6,420,904 B1 * | 7/2002 | Dutta et al. | 326/93 |
| 2002/0159303 A1 * | 10/2002 | Ware et al. | 365/194 |
| 2011/0292830 A1 * | 12/2011 | Yanggratoke | H04L 47/10 370/253 |
| 2012/0002558 A1 * | 1/2012 | Swartzentruber et al. | 370/252 |
| 2013/0010600 A1 * | 1/2013 | Jocha | H04L 43/026 370/236.2 |
| 2013/0176850 A1 * | 7/2013 | Mishra et al. | 370/235 |

* cited by examiner

*Primary Examiner* — Yaotang Wang
(74) *Attorney, Agent, or Firm* — John R. Pessetto; Charles A. Brill; Frank D. Cimino

(57) ABSTRACT

An embodiment of the invention includes a packet processing pipeline. The packet processing pipeline includes match and action stages. Each match and action stage in incurs a match delay when match processing occurs and each match and action stage incurs an action delay when action processing occurs. A transport delay occurs between successive match and action stages when data is transferred from a first match and action stage to a second match and action stage.

8 Claims, 12 Drawing Sheets

OPENFLOW MATCH AND ACTION PIPELINE STRUCTURE

This application claims priority from Provisional Application No. 61/724,105, filed Nov. 8, 2012.

BACKGROUND

Openflow is a networking communications protocol which separates the control and data planes of packet processing, enabling simpler and more efficient high speed data plane processing, and allowing the control processing of entire networks to be centralized under the control of a single software program. It is one of the enablers of Software Defined Networking. It is a stated goal of Software Defined Networking (SDN) to increase the flexibility and programmability of networks allowing users to more easily tailor networks to their needs.

Briefly, Openflow (OF) defines an Openflow switch to contain a series of associative flow tables. Each entry in a table contains ternary values (0,1, or dont-care for each bit) for a desired selection of packet fields, such as MAC source and destination addresses, IP source and destination addresses, TCP port numbers, etc. Openflow defines a number of standardized packet header fields for matching as well as allowing users to add their own custom fields. Table entries are in prioritized order, and for each individual packet processed by the Openflow switch, the table entries are searched in order for a matching entry. Note that table entries can have ternary values (don't-care for some or all bits) to match a broad selection of packets. When the first table match is found, a set of actions associated with that table entry is executed. These may modify fields of the packet, for example, by setting the MAC destination field to a new value, they may direct the Openflow switch to output the packet to a particular switch port in a particular queue, or send it to the Openflow software controller, or drop the packet. It is generally intended that when the existing flow tables don't know how to handle a packet, it is sent to the controller, which may respond by installing rules on the switch to properly process similar packets. This accomplishes the goal of control and data plane separation by having the Openflow controller software make the decisions concerning what flow tables to install, whereas the switch simply follows the directives of the controller instead of making complex behavioral decisions on its own.

In general, Openflow is defined to be able to flexibly match against packets, and directed by the matches, perform a comprehensive set of actions to modify the packet and decide what to do with it. This is done with a number of tables which operate on the packet sequentially.

When a packet enters a network switching device, it may be considered to be in one of two categories, depending on the number of destinations it is sent to by the device. Unicast packets are sent out one port to a single destination, whereas multicast packets are sent to multiple destinations. These multiple destinations may each get differently modified copies of the packet, and may be sent out different output ports. The process of sending multicast packets to multiple destinations, potentially each with a separately modified copy of the packet, is known in the industry as multicasting.

Another feature of Openflow is Openflow groups. There are several group types, but the ALL group is the one of interest. The actions taken as a result of a match can include a group. A group is a container containing a number of buckets, where each bucket in turn is a set of actions. This set of actions is similar to the actions executed by any table match, so this in general defines a recursive capability, where instead of doing just a single set of actions, there are multiple sets of actions. Groups can even be contained within groups by being in the actions of any group bucket. In the ALL group, each bucket is executed on a separately created copy of the packet. Each action in that bucket is executed on that bucket's copy of the packet. It is typically then output to a particular switch port into a specific queue, as directed by its actions. Each bucket may output to a different switch port. The end result of an ALL group is to produce a number of copies of a packet, each separately modified, and each potentially sent to a different destination port and queue.

Openflow ALL groups implement multicasting; the sending of a packet from one input port source to multiple output port destinations. Multicasting is a common and important function of switches. Multiple buckets may also send their own copies of the packet to the same output port; there is no requirement that each copy go do a different output port. So in general, as a result of ALL group processing, the packet may send multiple separately modified copies of the packet to each of several output ports.

Another group type, fast failover, chooses the first bucket of the group which is associated with a live port. If a switch has the capability to detect when links to its neighbors are inoperative, and respond by marking them as not live, then failover groups immediately respond by sending packets to an alternative destination. This improves the responsiveness of OF switches to the hardware failures which inevitably occur in large systems.

There are other OF group types. The select group chooses one of the several buckets to execute (instead of all of them in an ALL group). The choice of which bucket is outside of the definition of OF, but it is commonly done as a pseudo-random choice made by hashing on different packet header fields. So packets with different headers will randomly go to different destinations, while packets with identical headers will always go to the same destination together. In the example of a switch processing multiple video streams, each of which is its own flow with a specific set of values for its header fields, different flows would be pseudorandomly routed to different destinations, while all members of any flow would always go to the same destination. This feature is used to implement Equal Cost Multipath (ECMP), which gangs together several paths to achieve higher total bandwidth, with packets from different flows randomly assigned to each path to distribute the workload among the paths. It is desired that packets from the same flow be routed to the same destination, so that at the final destination packets arrive in order.

DETAILED DESCRIPTION

An embodiment of the invention includes a packet processing pipeline. The packet processing pipeline includes match and action stages. Each match and action stage in incurs a match delay when match processing occurs and each match and action stage incurs an action delay when action processing occurs. A transport delay occurs between successive match and action stages when data is transferred from a first match and action stage to a second match and action stage.

Figure 1:
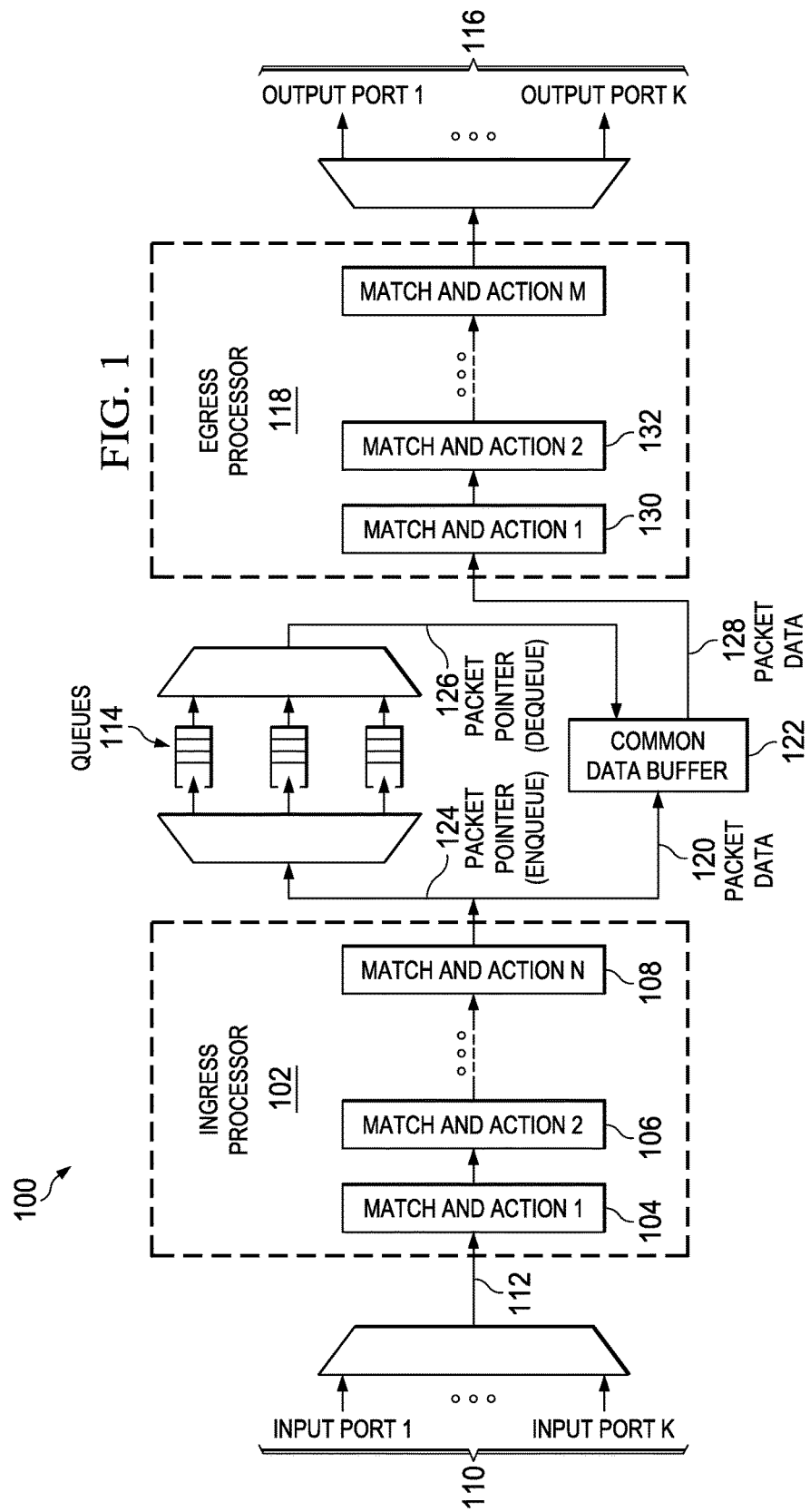
FIG. 1 is an electrical diagram, in block form, of a hardware switch architecture constructed according to embodiments of the invention.

In a hardware switch, difficulties associated with multicasting often are first order determinants of the architecture of the switch. A basic hardware switch architecture is shown in FIG. 1. It has an ingress processor 102 with a number of Openflow Match-Action stages 104, 106 and 108 which implement the matching and resulting actions described above. This match-action pipeline 100 may be shared by multiple input ports 110 by multiplexing those ports into the pipeline input 112 in round-robin fashion. When the pipeline 100 is finished processing, there are several options. Unicast packets, which have one destination, are put into an output queue for a single output port. Multicast packets are put into the queues 114 for several output ports, as described above. The pipeline 100 may choose to drop the packet and not output it to anywhere, or send it to the Openflow controller, which is in some ways similar to just another output port, but otherwise is not relevant to this discussion and won't be described further. These outcomes are all determined by table actions specifying an output port and queue, or by an ALL group specifying multiple destinations, or other table actions specifying drop (lack of any output port assignment) or output to controller.

Typically each output port 116 is serviced by several queues 114. To output a packet to a particular port 116, the egress processor 118 may choose a packet from any of its queues 114. A common feature of queues 114 is an associated priority. The egress processor 118 may choose its packet from the highest priority occupied queue. There may also be limits such that any queue doesn't get more than a particular fraction of the overall bandwidth. These queue features are commonly used to implement Quality of Service (QoS) capabilities. For example, delay-sensitive video traffic may be placed in a higher priority queue than low priority bulk data transfer traffic. Video may then be limited to some fraction of the overall bandwidth, for example 75%, so that the lower priority data transfer traffic gets some bandwidth and isn't starved out. In that way, when there is contention for the output bandwidth, it can be allocated as desired. Queue systems can be more complex than this, featuring a hierarchy of queues, but in general operate using priorities, max rate limits, and min rate bandwidth guarantees.

Packets vary significantly in size; a minimum sized packet may be 64 bytes, while large ones can be up to 1.5 Kbyte or even over 9K bytes or larger in size. As a result, packets are typically broken up into data cells 120, and stored in a common data buffer 122 as a linked list of these cells, where a pointer associated with each data cell provides the address of the next data cell in the packet. The entire packet may be referenced by the pointer to its first data cell, called a packet pointer 112. The associated action of putting a packet into an output queue for a particular port is actually just putting the packet pointer into the queue. Concurrently, the packet 120 itself is stored in the common data buffer 122.

If the architecture of FIG. 1 is instantiated into a particular switch, it has a specific number of input ports each at a specific bandwidth. The bandwidth through the match-action pipeline is the sum of the bandwidths of the input ports 110. When packets are unicast, and therefore each packet outputs to a single output port and queue, that bandwidth is roughly maintained from the output of the match-action pipeline into the data buffer 120. There are two aspects to bandwidth. Maximum bit rate is the sum of the bit rates of all the input channels. For a 64 port switch, where each channel is 10 Gb/s, the input bandwidth is 640 Gb/s. The other aspect of bandwidth is packet rate. For a channel with a particular bit rate, the packet rate is maximized when the packets are of minimum size. At 64 channels of 10 Gb/s, with minimum 64 byte packets, the maximum packet rate through the match-action pipeline is approximately 960M packets/s (note there is some space between packets, effectively increasing the minimum packet size to above 80 bytes).

So when the switch of FIG. 1 is processing unicast packets, the bit rate required to write data into the common data buffer 120 is roughly the same as the total input bit rate. The rate at which packet pointers 124 are written into the queues 114 is the packet rate, the sum of the packet rates of all the input channels.

The requirements for processing multicast packets are more severe. If for example, a packet from one input port broadcasts to all other ports (for example 63 others), then the architecture of FIG. 1 has to write 63 separate copies of the packet into the common data buffer in the time it would have to only write one packet in the unicast case. This is referred to as requiring a 63× over speed. Also, packet pointers 124 have to be written to 63 queues instead of one in the unicast case. Furthermore, this covers the case where there is one copy of the packet sent to each of the 63 output ports, but not when multiple copies of the packet are sent to each port.

In general, it is desirable to optimize the match-action pipeline for the total input bandwidth, and requiring it to output packet copies much faster (63× in this example) is an unreasonable request which will result in a far more expensive, sub optional implementation.

Figure 2:
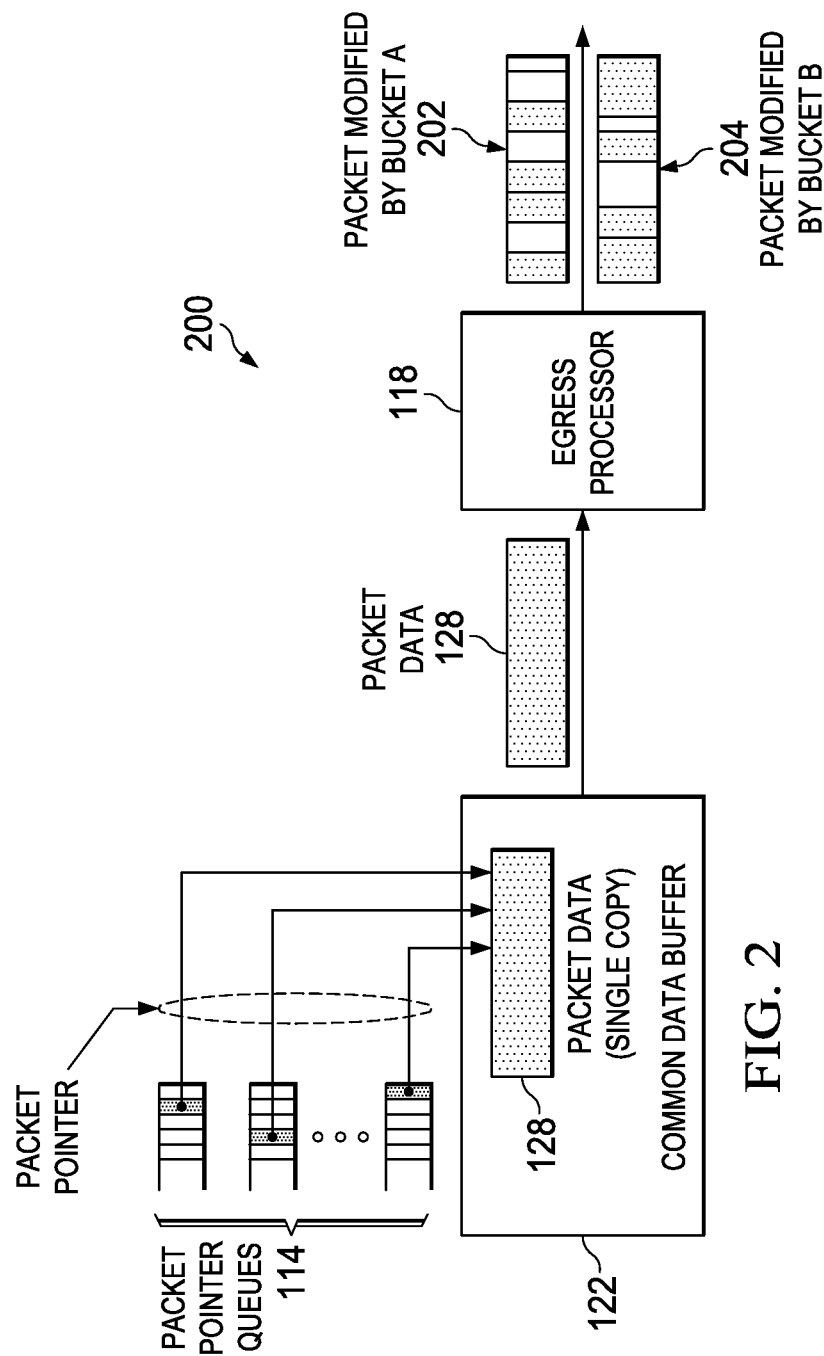
FIG. 2 is an electrical diagram, in block form, illustrating how to store a single copy of a packet in a common data buffer before it is separately modified by each bucket according to embodiment of the invention.

It is preferable to store a single copy of the packet in the common data buffer 124 before it is separately modified by each bucket, and then do the bucket modifications in the egress processor 118. This is illustrated in FIG. 2. In the last match-action stage 108, the ALL group must represent the buckets contained in the group. It must store the portion of the bucket actions which assign the packet to a particular port and queue. But all the other actions associated with the bucket are moved to the egress processor 118. These are the actions which modify the packet separately for each output. Now only one copy of the packet must be stored in the common data buffer 122, pointed to by a single packet pointer 126. Note that in the match-action pipeline, each group bucket still needs to enque the packet into a number of output ports' queues. The single packet pointer for the packet will be enqueued into each of the several output ports' queues.

In the case where the group has multiple packet copies outputting to the same port, rather than putting multiple entries into the output queue of that port, only one entry can be enqueued, along with a number representing the number of copies of that packet to be output before that entry is dequeued. This feature means that at most one copy of the packet pointer 124 needs to be enqueued for each output port. But still, a separate copy needs to be enqueued for each port (63 in the above example).

For unicast data, once a packet 128 is read out of the common data buffer 122 into the egress processor 118, those data cells containing that packet 128 can be freed for future use. For multicast data, that same packet data 128 is used multiple times. A copy-count field must be stored associated with that packet, which gets initialized to the number of total copies the packet will output, and which gets decremented each time a copy of that packet is output. When the copy-count reaches zero, all copies of the packet have been output, and the data cells containing that packet can be freed for future use.

As a result, the structure required in the ingress match-action stage 102 to implement an ALL group is a list of buckets, where for each bucket the output port and output queue is maintained. If the queue ID is the same for all output ports, then it may be stored only once for the whole ALL group. In the egress processor 118, each bucket is represented by the remainder of the actions after the port and queue assignment have been removed. In light of the requirement to output multiple copies of a packet to the same port, the ingress match-action stage 102 ALL group buckets contain at most one entry for each output port, along with a number stating how many copies of the packet go to that output port.

The implementation of the group buckets in the egress processor 118 is to organize them into an Openflow table, where each bucket is realized by an Openflow table entry, where the actions in each bucket are expressed as the Openflow table entry's actions, and the individual entries are accessed by matching against the group ID and an indicator of the bucket ID. There are two inventive representations of the bucket ID. One is simply obtained by numbering all the buckets of a group sequentially, giving each bucket a unique number. Another recognizes that the output port assignment, which is carried in the packet queue entry and made available as a match field in the egress processor, is already an ID which discriminates between packet copies destined for separate output ports. All group buckets for each output port are numbered sequentially, and that port-index-ID, together with the port number, serve to identify the bucket.

As an example, if an Openflow ALL group G had a total of 6 buckets, one outputting to port A, two to port B and three to port C, the ingress match-action stage 102 implementing the ALL group would have three entries, the first stating the (output-port, number of copies) as (A,1), the second entry would be (B,2) and the third would be (C,3). In the second inventive implementation of Openflow group buckets using egress match-action tables, there would be an Openflow table in egress containing the 6 entries below:

| group | port | port-index-id |
|-------|------|---------------|
| G | A | 1 |
| G | B | 1 |
| G | B | 2 |
| G | C | 1 |
| G | C | 2 |
| G | C | 3 |

This table may also contain entries for other ALL groups.

So in the egress group table, the fields matched would be the group ID and the bucket number in the first realization. It would be the group ID, the output port number, and the port-index-ID in the second realization. There may be any number of ALL groups, and all of their egress buckets can be organized into a single Openflow table. Once a group bucket has been matched in this way, the actions associated with the table entry are executed.

Note that an ALL group can output more than one copy of a packet to any individual port. This capability is implemented by storing in the ingress ALL group a list of buckets, where for each included output port only one bucket is provided, and in that bucket is a field which states the number of copies output to that port. When the packet pointer is enqueued into the queue for that output port, the field describing the number of copies for that port is stored with it, the per-port copy-count. As a result, no matter how many copies of a packet get sent to a particular output port, the packet pointer is enqueued only once for that output port. This requires that each copy is put into the same queue for that output port. Then when the egress processor 118 outputs that item from the top of the queue, it reads the per-port copy-count field, and outputs the packet that number of times before retiring that entry from the top of the queue. The index number describing the current iteration number of the copy-count field is also sent to the egress processor as a field on which the Openflow tables can match.

As a result of the inventive implementation, it is possible to implement Openflow ALL groups without specific dedicated structures for containing the packet modifying actions of the groups. Instead, existing match-action structures 104, 106, 108, 130, 132 and 134 are used. This leads to a simplification of the design.

Note that though it is not specified in the Openflow 1.3 standard, it is possible to continue doing further Openflow match-action operations in the egress pipeline. If this is done, it uses a set of hardware resources, for example memory to store match and action table entries, and the table used by the ALL group buckets uses some of this resource. It is just an Openflow table like any other egress table. In this inventive implementation, ALL group buckets and egress match-action tables share common resources, and so the user can apportion them as desired between ALL group buckets and egress match-action tables. Note further that if Openflow table hardware resources are shared between the ingress match-action tables and the egress match-action tables (including ALL buckets), then the ALL group buckets are taken from a pool of even larger resources. When implementing hardware switches, tables are resources which consume area, for memories for example, and are a limited resource. Providing a single resource which can be apportioned as desired by the user between ingress Openflow tables, egress Openflow tables and ALL group egress tables, is more desirable than partitioning the resources in hardware into fixed portions for each of these portions of the architecture.

Figure 3:
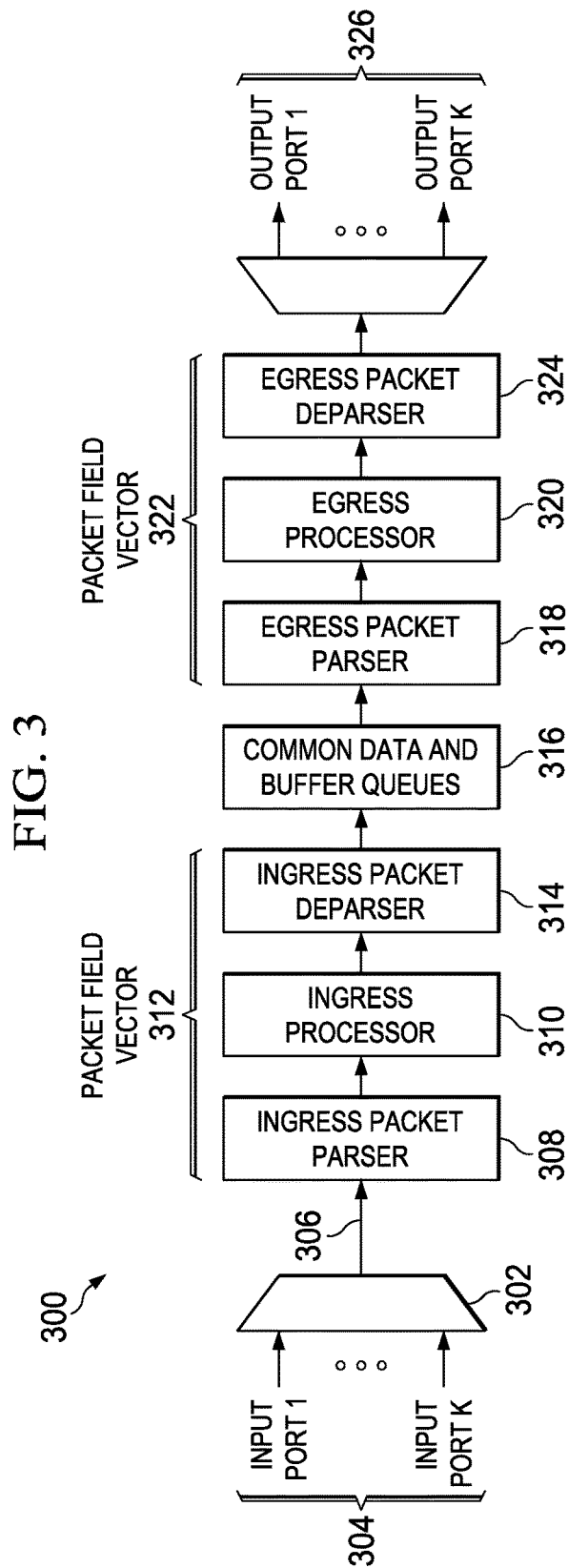
FIG. 3 is an electrical diagram, in block form, of a hardware switch architecture constructed according to embodiments of the invention.

FIG. 1 shows the ingress processor 102 implemented as a series of Openflow match and action stages 104, 106 and 108, and the egress processor 118 likewise implemented with a series of match and action stages 130, 132 and 134. FIG. 3 shows a higher level block diagram 300, starting with an input multiplexer 302 which rotates among several input ports 304, providing packet data 306 to an ingress packet parser 308. This parser 308 translates the representation of the incoming packet into one where header fields of the packet are put into standardized locations in a packet field vector. For example, the packet field vector 312 has predetermined locations for all packet header fields, like MAC source and destination addresses, ethertype, IP source and destination addresses, IP type, TCP input and output port numbers, VLAN and MPLS tag fields, etc. Any individual packet may or may not contain specific fields, but if the packet does contain the field, it is put into the predetermined location for that header field in the packet field vector. For example, if the IP type of a packet is not TCP, it will not contain TCP port numbers. While individual packet header fields may be in different locations in the packet, the parser always puts them into the same location in the packet field vector. For example, a VLAN tag is 4 bytes wide, and will put all subsequent fields, like IP and TCP headers, 4 bytes farther into the packet if it is present compared to when it's absent. But considering an IP source address field for example, while it is in different positions in the packet given the presence or absence of a VLAN tag, it is always in the same position, or slot, in the packet field vector. Note that the packet field vector requires a bit for each slot contained in it to specify whether there is data in that slot or not. For example, if the packet contained a VLAN header, the valid bit would be set to one for the slot representing VLAN in the packet field vector 312, otherwise it would be zero.

According to the 7 layer OSI packet protocol specification, packet header fields correspond to layers of the model. MAC is layer 2, IP is layer 3, TCP is layer 4, etc. Generally, layer numbers increase progressing further into the packet. But sometimes a packet is encapsulated, using any one of a number of existing standards (for example, VXLAN, GRE, NVGRE, or PBB). In that case, the packet may progress up to a certain layer (3 for example) with the encapsulating fields, then start all over again at layer 2 with the original packet contents. In that case, there may be multiple copies of fields at a particular layer (two copies of layer 2 and 3 in the example above). The two versions of a layer are generally referred to as inner and outer. There may be more than two copies if the packet is encapsulated multiple times. There may also be multiple copies of tag headers such as VLAN or MPLS, which can again be referred to as outer and inner, or innermost. There are many types of encapsulations using varying layers, but they all have in common the presence of inner and outer versions of some of their fields.

To represent packets which have multiple copies of a header or are encapsulated, there will be multiple places in the packet field vector 312 which store the same field type (like IP destination). The outermost copy will be in one predetermined location, the next outermost will be in a different location, and so on for each copy of the header. Each copy will have its own associate valid bit. These fields can also be referred to as nested fields.

Generally, while the field assignments into the packet field vector 312 are predetermined, they are not hardwired and inflexible in a hardware implementation. Generally, they are programmed into the parser as software or firmware, directing the parser to deposit each recognized field into a specific output location.

Other data may be put into the packet field vector 312 for use by the ingress processor 310. This could include the input port number of the switch for example. Other locations may be specified for internal use by the ingress processor 310, for example as locations to set with a value which may be used by later processing of the packet.

The packet field vector 312 is made of a number of fixed width slots, for example of one number of one byte slots, a second number of two byte slots, and a third number of four byte slots. Larger fields in the packet, for example 128b IPV6 sources or destinations, could populate several packet header field slots, for example 4 32b slots for IPV6 addresses. Fields with widths which don't exactly match the provided slot widths could populate a number of different slots which sum to the required width. For example, a 48b MAC source or destination address could populate a 16b and a 32b packet field vector slot.

The ingress processor 310 may modify fields of the packet. For any given field, it does so by setting a value into that field's location (slot or slots) in the packet field vector. It may add a field by putting data into that location in the packet field vector and setting that location's valid bit to one. It may delete a field by setting that location's valid bit to zero. It may modify the outer, innermost, or any specific copy of a nested field, since each copy has its own predetermined location. It can also do complex operations which break down to multiple of these types of operations.

The parsed packet format used by the packet field vector 312 will in general require more bits to represent than an individual packet will contain. While an individual packet holds some particular set of headers, the packet field vector must be large enough to represent all possible header combinations the switch expects to process. Note the parser may decide to only parse fields that the switch expects to be using for processing. For example, if the switch only uses MAC addresses (at layer 2), layer 3 and above headers (IP, TCP etc) are simply considered data and don't need to be parsed into the packet field vector.

The ingress processor outputs its modified packet into the common data buffer. But before doing so, the packet must be formatted back into standard ethernet packet format from the packet field vector, essentially undoing the parsing action of the parser. This is done by the ingress packet deparser 314. This keeps the volume of data to write into the common data buffer approximately the same as the volume of incoming data. Without the deparser 314, many short packets with simple headers would have to write much longer header information, consisting of the full packet field vector data width.

When the egress processor 320 chooses a packet from a particular output port's queue, it first must parse it, again into the format of the packet field vector 322. Then the egress processor 320 does whatever packet modifications apply to this packet, following which the packet is again deparsed 324 into standard ethernet format and output.

Figure 4:
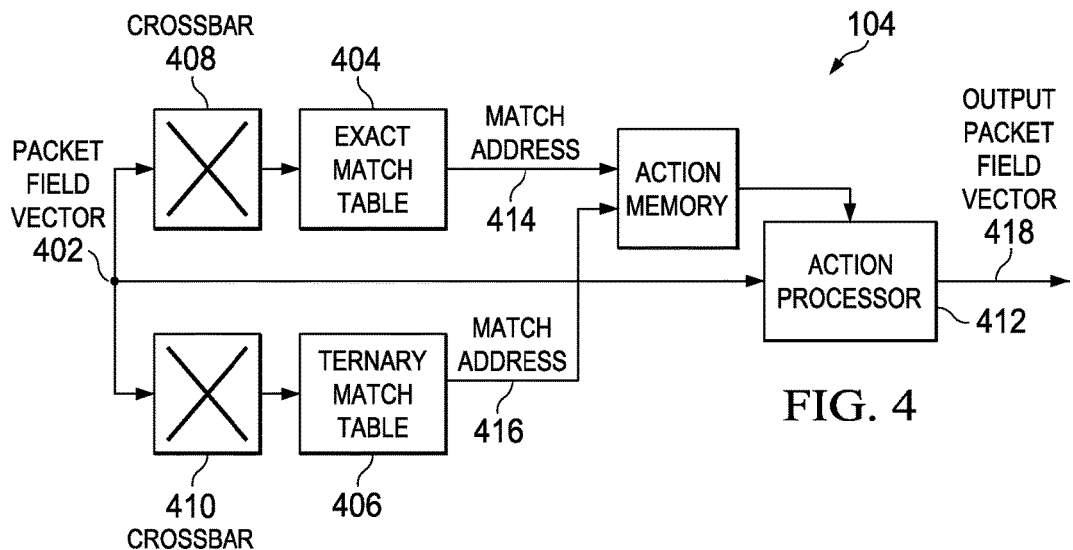
FIG. 4 is an electrical diagram, in block form, of a single match and action stage constructed according to embodiments of the invention.

FIG. 4 shows a single match and action stage 104 of FIG. 1. The match and action stage 104 inputs a packet field vector. Recall that the Openflow specification declares a number of sequential tables, each of which can be used to match against an arbitrary subset of all the packet header fields (as well as other fields, generally referred to as metadata, which are also contained in the packet field vector). FIG. 4 shows two matching tables, an exact match table 404 and a ternary match table 406. An exact match table 404 contains entries which have to exactly match its input data pattern from the packet, bit for bit, whereas a ternary table 406 has entries where each bit can be 0, 1 or dont-care, enabling it to match a large number of individual header field combinations with a single entry. In order to select a specific set of fields to match, at the input to each of the exact 404 and ternary 406 match tables is a crossbar 408 and 410. A crossbar 408 and 410 has a number of input fields and a number of output fields, where generally each output field can select any of the input fields. It is therefore a collection of multiplexers, one for each output field.

Generally, ternary tables 406 can be implemented using TCAMs (ternary content addressable memories). These memories store a number of ternary entries, and accept as input a ternary search word. They compare each location for a ternary match to the search word, and output for each location whether there was a match or not. A ternary match for a bit succeeds if the bits match, or either the stored data bit or the search bit is a dont-care. The matches output from each stored word may optionally be combined by a prioritizer to output the address of the highest priority match, where priority is ordered by the address of each entry in the TCAM. Or the TCAM may simply output the vector of match indications, in which case the prioritization is done by external logic. In either case, the ultimate result is an indication of whether a match occurred, and the address of the highest priority match. Sometimes an additional output is desired to indicate whether more than one entry matched, though that isn't used in this application of TCAMs.

Exact match tables are implemented by using SRAMs as hashtables. Generally a hashtable takes some or all of the input bits of a search word, and generates a pseudorandom, but predictable, number from those bits. One method of hashing generates an N bit address from an M bit input, where for each of the N hash output bits, a separate M bit mask is and'ed with the input data, then the parity of the result is taken. The input bit mask for each hash output bit is different, and there are methods known in the art to select masks with desirable properties. There are multiple methods of generating hash addresses known in the art, but all of them attempt to generate an address, where for all data inputs, the addresses end up uniformly distributed across the N bit address space. Hash tables operate by accessing an array of data at that hashed location, and checking to determine whether it is the desired data. Hash tables also have to contend with the possibility of address collisions, where multiple distinct inputs hash to the same address. There are many techniques known in the art for accomplishing this. Multiway hashing addresses this by making K hash addresses instead of one, and looking up the data in those K separate locations. Cuckoo hashing further refines this by moving around existing entries to make space for new entries. When one or more entries are retrieved from the hashed locations, they are compared against the search data to determine if they match. The search entries can be stored in RAM and search data input, and it can be determined what location, if any, matched the search data. Likewise, hashtables implemented in hardware may include additional logic, such as a number of match entries used as overflow locations when hash collisions prevent an entry from being installed in the table. Additional logic such as this is also known art, and is included in the definition of making a hashtable using RAMs.

Both the exact match 404 and the ternary 406 match units must match slots of the packet field vector 402. They must match not only the values of data in the slots, but the presence or absence of data as indicated by the slot's associated valid bit. Note that in a ternary match it is possible for a match entry to have a dont-care for the valid bit as well as for the data bits.

The exact match 404 and ternary 406 match units each output an indication of whether there was a match, and if so, its match address 414 and 416. When a unit matches, its address is used to look up an entry in the action memory 412. This action entry contains instructions and data for modifying the packet, for outputting it to a particular port and queue, for group operations, and for providing the index of the next Openflow table to use. These actions are specified in the Openflow standard. While in general, the actions provide the capabilities required by the Openflow standard, the correspondence between the standard and the implemented actions may not be exact. For example, Openflow can specify a virtually unlimited number of individual actions from a match, whereas hardware has a limit to the number of operations it can perform. Conversely, the actions provided can constitute a superset of those required by Openflow. For example, it is advantageous to include as many as possible instructions which correspond to those found in general purpose microprocessors. This refers to the general capabilities of the instructions, for example the ability to do move, copy, arithmetic, logical and compare operations, rather than to an exact correspondence to a particular processor's instruction set. In this way, a general capability is produced to implement a large variety of potential actions.

The actions specified by a match will modify the contents of the packet field vector 402. Some operations, such as move, add, and shift, will use the current values of some locations as sources, whereas other operations, like set a value to a constant specified in the action memory, do not use the incoming value of field vector locations, they just set output values.

An individual Openflow match and action stage contains a specific amount of exact match 404 memory and a specific amount of ternary 406 match memory. Given that ternary match memory using TCAM is more expensive in terms of silicon area than exact match memory using SRAM, it is likely advantageous to include more exact match memory capacity than ternary match capacity.

Each memory is organized into W words by B bits, where the word and bit sizes of ternary and exact match memory do not have to be equal. In general, the bitwidth B is set large enough to match against the widest set of fields anticipated for use. Openflow 1.0 defines a set of match fields which sum to 340 bits in width, so the width B is generally in the hundreds of bits.

While the table width may be hundreds of bits, it is anticipated that many matches desired by users will be substantially less than 340 bits in width. One of the goals of later Openflow releases, starting with 1.1, is that providing multiple tables will allow the user to make each table serve a more specific and limited function, requiring the inputting of a smaller set of input fields to match. A match table hundreds of bits wide would therefore often have many or most of its bits unutilized. To address this problem, both the exact 404 and ternary 406 match tables can be configurable. By splitting the memory into several chunks of smaller bitwidth, each becomes a separately functioning set of table entries which can be combined into a table with a larger number of words. For example, splitting a W entry 340 bit table in half widthwise could be used to create a 2W entry 170 bit table. Splitting it in fourths could be used to create a 4W entry, 85 bit table, etc. The same concept can be applied to ternary match memory.

When tables are split into narrower ones, instead of merging them into a table with a larger number of entries, they can be used to create separate tables. Or they could be combined in groups to create a variety of different configurations. For example, a table of W entries and width B, when split into fourths could create a table of W entries and B/2 bits, along with two tables of W entries and B/4 bits. Or as another example, it could make a table of W entries and B/2 bits and a table of 2W entries and B/4 bits.

In the case where a user desires an exact match 404 or ternary 406 match table with size larger than the provided capacity of the single Openflow match and action stage 104 of FIG. 4, the tables of multiple stages can be combined to make a larger table. For example, if each stage contains W entries of B bit wide exact match table which can be partitioned into tables of width B/4, and the user wants a table of 10W entries and width B/4, that table can be created using two full Openflow match and action stages, which together provide 8W B/4 width entries, along with half of the capacity of the prior or subsequent stage to provide the other 2W entries, or ¼ of the capacity of the prior stage and ¼ the capacity of the subsequent stage.

In the case where a user has partitioned both the ternary 406 and exact match 404 stages by dividing them bitwise at B/4 intervals, it is possible to configure them as 8 separate Openflow tables. They all run concurrently, at the exact same time. However, the Openflow standard defines tables as a series of entities which operate sequentially. This means that the result of processing one table is made visible before processing the next table. There are three types of ways in which a table can be dependent on a prior table. First, a table may modify a field which is used as a match input to a subsequent table. This is called a match dependency. Second, a table may modify a field which is used as a data input to an action in a subsequent table. For example, one table may set the TTL (time to live) field in the IP header, and a subsequent table may decrement that TTL. That is called an action dependency. Third, the match output from each table specifies the index of the next table to execute. No next table means processing is done. If A, B and C are three successive tables, table A when executed can set the next table to B, C, a later table, or none. Only in the first case does table B get executed. So its execution is predicated on the successor indication from table A. This is called a successor dependency.

If a table has a match dependency on a prior table, it cannot be run concurrently with that table, and so cannot be placed in the same match and action stage as the prior table. It must be placed in a later stage. Likewise, if a table has an action dependency on a prior table, it cannot be run concurrently with the prior stage and must be placed in a later match and action stage.

If a table has a successor dependency on a prior stage, it is possible to resolve the dependencies within the logic pipeline of a single match and action stage, and therefore the table can be placed in the same match and action stage as the prior table and run concurrently. Table predication chaining logic is required to resolve the dependencies.

Generally, the type of dependencies between tables can be derived by examining the match input fields, modified output fields, and fields used to modify other fields of the tables. Alternately, the allowed sets for each of these can be declared in advance, and only conforming entries allowed into the table. For example, the fields used as match inputs in one table can be examined against modified output fields of prior tables to establish match dependencies. This information can be considered to be static and unchanging from packet to packet.

Figure 5A:
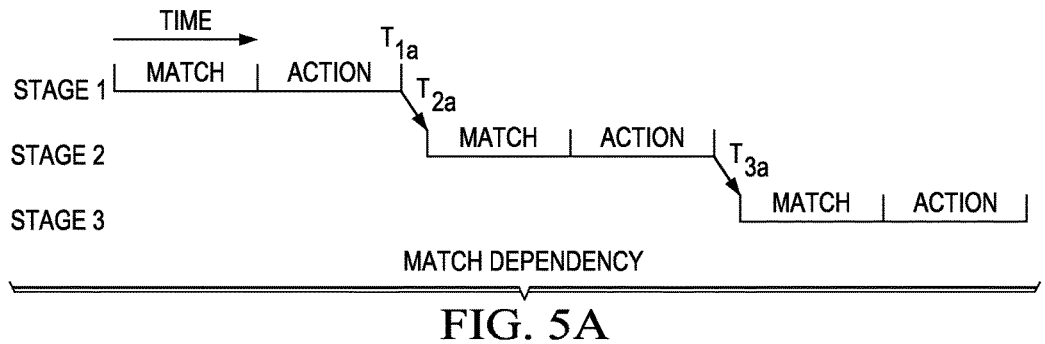
FIG. 5a is a timing diagram showing the timing of sending a packet through three stages when there are match dependencies between the stages according to embodiments of the invention.

Referring to FIG. 1, in a hardware implementation, each match and action stage 104, 106, 108, 130, 132 and 134 is implemented as a separate unit. Because of the physical size of each unit, some time is necessary to transport the packet field vector between units. For example, this transport delay may be one clock cycle. FIG. 5a shows the timing of sending a packet through three stages when there are match dependencies between the stages. The action result of the first stage is available at time t1a, and after transport delay the modified packet field vector arrives at the input of stage 2 at time t2a. Likewise, after the full processing delay of stage 2, and a transport delay, the packet field vector arrives at the input of stage 3 at t3a.

Figure 5B:
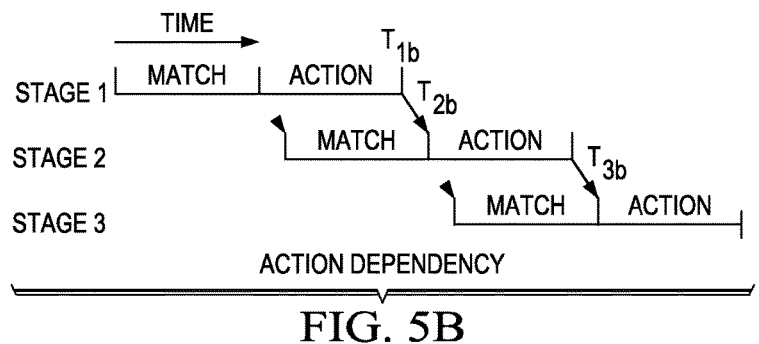
FIG. 5b is a timing diagram showing the timing of sending a packet through three stages when there are action dependencies between the stages according to embodiments of the invention.

In the case of an action dependency, the output result of a stage must be made available to the input of the next stage in time for it to be used by the action unit. In FIG. 5b, the result of stage1's actions are available at time t1b, and after a transport delay are available at the input of stage 2's action unit at time t2b. Likewise, after stage2's action processing and a transport delay the packet field vector is available at the action unit of stage3 at time t3b.

Figure 5C:
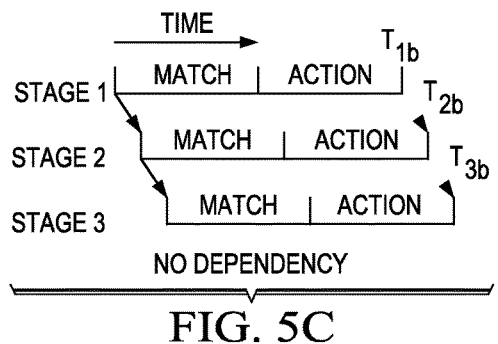
FIG. 5c is a timing diagram showing the timing of sending a packet through three stages when there are no dependencies between the stages according to embodiments of the invention.

In the case of no dependency, the separate stages are delayed in time from each other only by the transport delay, starting at t1c, t2c and t3c respectively, as shown in FIG. 5c.

Referring again to FIG. 5c, in the case of no dependency, the multiple stages are separated in time only by transport delay, and the input to stage 1 is also sent without modification to the inputs of stages 2 and 3. However, stage 1 modifies the packet field vector, and the result of that modification is sent on to stage 2, which further modifies the packet field vector and passes it on to stage 3 for its modifications. Generally, at stage2, packet field vector slots which are modified are sourced from the stage 2 action unit, whereas slots which aren't modified are passed through from stage 1's output. This means there are two separate copies of the packet field vector passing between stages 1 and 2, or between any successive pair of stages. There is the copy going to the stage input, and the copy going from the stage output to the next stage's output, where it is merged with that next stage's packet field vector.

FIG. 5b shows that in the case of an action dependency, one copy of the packet field vector is broadcast to the stage inputs, while a second copy is sent from each stage's output to the input of the next stage's action unit. So when there is either a match or action dependency, two copies of the packet are sent between stages. FIG. 5a shows that in the case of a match dependency, only one copy is used.

Figure 6:
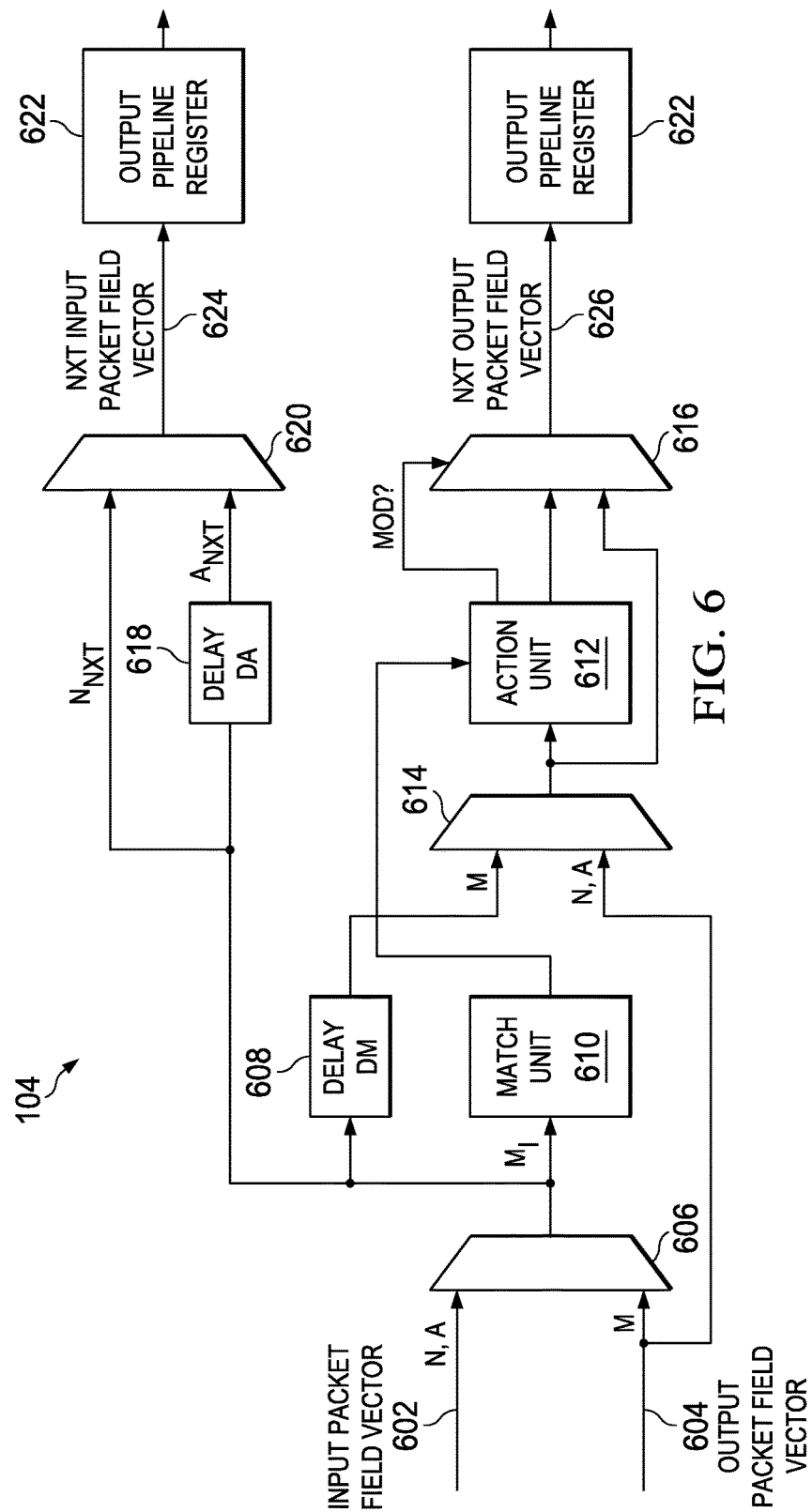
FIG. 6 is a logical diagram of a match and action stage illustrating how two copies of an input packet field vector and a output field vector are used according to embodiments of the invention.

FIG. 6 shows a logic diagram of a match and action stage showing how the two copies of the packet field vector, input 602 and output 604, are used. The two copies are input to the unit at the left, and two copies are produced at the right for input to the next unit. There is a match input multiplexer 606 providing the data input to the match unit. In the case of a match dependency, it chooses the output version from the previous stage, as indicated in FIG. 6 by the M on that mux input, otherwise it chooses the input version, consistent with the behavior of the diagrams of FIGS. 5 a-c. This is indicated in FIG. 6 by N,A on the other mux input, for null or action dependencies. In the case of a match dependency, the match unit data input Mi is delayed by delay unit DM 608 by the same delay as the match unit 610, and that is selected as the data input to the action unit 612 by the action input mux 614. This is indicated in FIG. 6 by the M on that input to the action input mux 614. In the case of no or action dependencies (N or A at the action input mux 614 and match input mux in FIG. 6) the input mux 614 selects the input packet field vector 602 version, and the output packet field vector version 604 is passed to the action unit by the action mux 614. The action unit input can be directly bypassed around it to the next output packet field vector by the action output mux, so that unmodified fields go through with no delay. The action unit can modify fields, or in the case of an action dependency from the prior stage, send unmodified fields through the action unit 612 with the same delay that modified fields incur. Finally, the match unit input data Mi is sent to the next input packet field vector, either with no delay for no dependency to the next stage, or with delay DA 618 matching the action unit 612 in the case of an action dependency to the next stage. This is done by the next input mux 620. These dependencies are the dependencies of the next match and action stage relative to the current stage, whereas the dependencies for the other muxes are the dependencies of this stage upon the prior stage.

Transport delay can be allocated through incorporation of the output pipeline registers 622. With these present, successive tables with no dependencies would operate with one clock cycle additional delay apiece. More registers could be inserted in series for larger transport delay, or the registers removed for no additional clock cycles of transport delay. It is also possible to slide the registers back along the signal path to any set of locations which delays all the signals by a cycle, even back to the inputs. Or the registers could be split into latches. All of these pipelining techniques are known in the art.

The configuration of the muxes of FIG. 6 is set up based on analysis of table dependencies, and does not dynamically change per packet.

Figure 7:
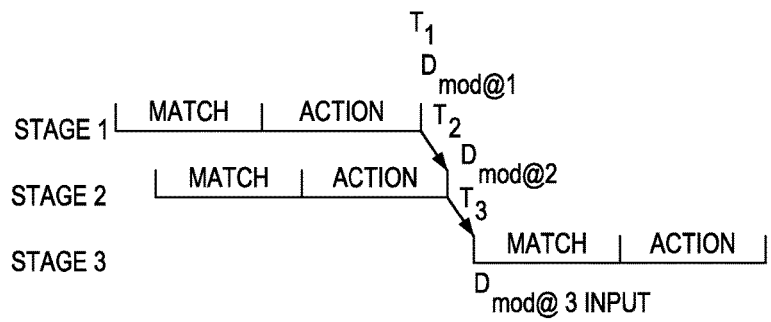
FIG. 7 is a timing diagram showing the timing of sending a packet through three stages according to embodiments of the invention.

More complex dependencies are possible, but in the implementation they reduce to the above described match, action and successor dependencies. Consider three successive match and action stages, A, B and C (not shown). There are no dependencies from A to B, none from B to C, but there is a match dependency from A to C, meaning though B does not match on a field that A modified, C does match on a field that A modified. The data modified by A arrives at the output of B one transport delay later than it would arrive at the input of B. Relative to the pipeline timing of B, this is exactly the same time it would arrive at B's output if it were modified by B instead of A. As a result, the dependencies required by the hardware are no dependency from A to B, but a match dependency from B to C. This is illustrated in FIG. 7. At time t1, the data modified by stage1 Dmod@1 is at the output of stage 1. After a transport delay, at time t2 it arrives as Dmod@2 at the output of stage 2. After the additional transport delay between stages 2 and 3, it arrives at time t3 as Dmod@3input at the input of stage 3. If there were more than one stage between the two stages linked by a dependency, the dependent stage (stage 3 in the diagram) would still have the same match dependency to the prior stage. If the dependency were an action dependency instead, it would be configured with an action dependency delay from the prior stage. In general, the hardware capabilities of properly handling match and action dependencies to immediately prior stages also handle them to stages earlier in the pipeline.

Referring to FIG. 6, the first match and action stage in a pipeline operates by configuring its muxes in the same way it would for a match dependency to the prior stage. As a result, for the first stage, only one of the inputs to the match input multiplexer 606 is used, so only one signal need be provided and the match input multiplexer 606 may optionally be optimized out.

Referring back to FIG. 1, both the ingress 102 and egress 118 processors are implemented using Openflow match and action stages. If separate hardware is provided to implement each of the ingress 102 and egress 118 units, a decision must be made about how to partition the hardware between ingress 102 and egress 118. For example, they could have the same number of stages, or egress could have more stages, or more probably, since egress processing is usually less extensive than ingress processing, egress could have fewer stages. Or the table capacity of each stage could be different for ingress 102 and egress 118. But it is highly unlikely that a single partitioning decision will satisfy the varying needs of different customers. For that reason, ingress 102 and egress 118 hardware are merged in a way which allows the amount of resource devoted to each to be configurable by the user.

Figure 8:
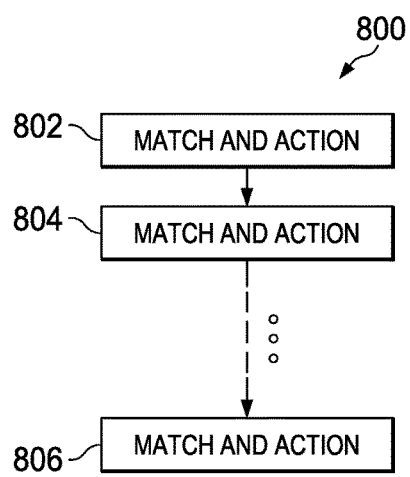
FIG. 8 is an electrical diagram, in block form, of a single match and action stage which can be used to implement both ingress and egress match and action pipelines according to embodiments of the invention.
Figure 9:
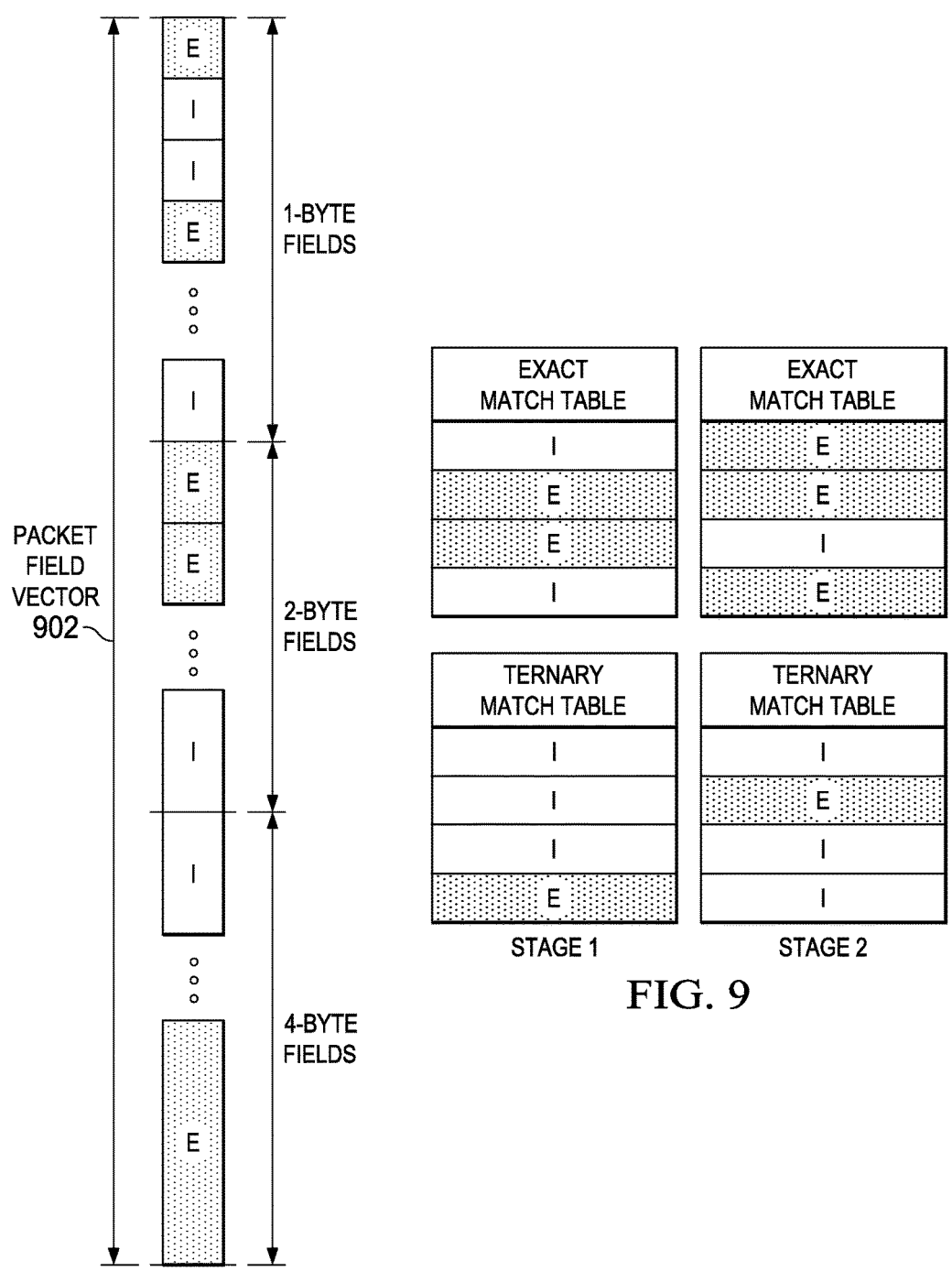
FIG. 9 is a block diagram illustrating how each table in each stage can be configured to belong to either ingress or egress according to embodiments of the invention.

FIG. 8 shows a single match and action pipeline which can be used to implement both the ingress and egress match and action pipelines. Externally, it simply appears as a single pipeline similar to the ingress 102 or egress 118 pipeline of FIG. 1. Recall that each Openflow match and action stage can implement a multiple of both exact and ternary match tables. Each individual table in each stage can be configured to belong to either ingress or egress, as illustrated in FIG. 9. Each of the slots of the packet field vector can also be configured to belong to either ingress I or egress E, as shown in FIG. 9. For correct operation, if a table is assigned to ingress I, its input crossbar (from FIG. 4) will be configured to only select slots from the packet field vector which are also assigned to ingress I. Likewise, if a table is assigned to egress E, its input crossbar will be configured to only select slots from the packet field vector which are assigned to egress E. Any table which is assigned to ingress I will have actions for its entries which only modify packet field vector slots assigned to ingress I. Likewise, any table which is assigned to egress E will have actions for its entries which only modify packet field vector slots assigned to egress.

Referring to FIG. 5, there can be different pipeline dependencies between stages, being either match, action or no dependency (table successor dependencies are grouped with no dependencies because they incur no clock cycle delay). These dependency configurations will be different for ingress and egress, creating different pipeline schedules for ingress and egress processing. Consider the muxes of FIG. 6, the match input multiplexer 606, action input mux 614, action output mux 616 and nxtinput mux 620, which are all configured differently to implement the various types of dependencies. There are two copies of each mux's control kept, one for ingress and one for egress, and the control of these muxes is separated for each slot of the packet field vector, with each slot's control choosing the ingress or the egress control value, according to whether that slot of the packet field vector belongs to ingress or egress.

Figure 10:
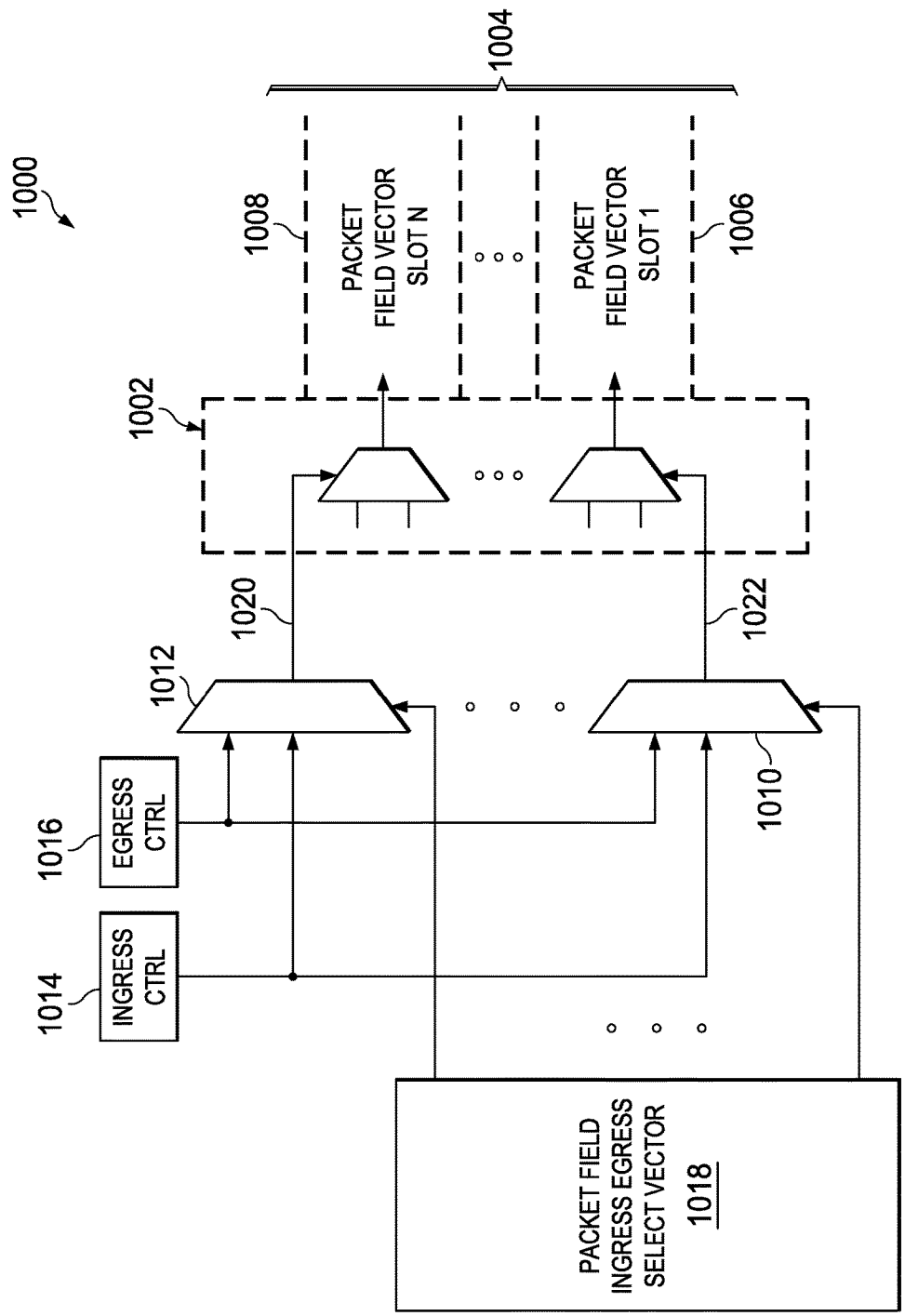
FIG. 10 is an electrical diagram, in block form, of logic used to control the match input multiplexer, the action input multiplexer, the action output multiplexer and the nxtinput multiplexer according to embodiments of the invention.

FIG. 10 shows a diagram of the logic 1000 to control the match input multiplexer 620, action input mux 614, action output mux 616 and nxtinput mux 620, which are referred to as the pipeline config mux in FIG. 10. The term pipeline config mux is meant to represent any of the muxes it refers to. The pipeline config mux 1002 switches data corresponding in width and function to the packet field vector 1004. The packet field vector 1004 is split into slots of varying width (for example, 1,2 and 4 bytes). The pipeline config mux 1002 is likewise split into slots. The control for each slot comes from a mux control select multiplexer 1010 and 1012, which allows the control of the pipeline config mux 1002 to come from either ingress control values 1014 or egress control values 1016. The choice of ingress 1014 or egress 1016 control values is made on a per slot basis, controlled by the packet field ingress egress select vector 1018. This vector 1018 has one bit for each slot of the packet field vector, where each bit is set to one state to indicate the slot belongs to ingress, and to the other state to indicate that the slot belongs to egress. Through the logic of FIG. 10, each pipeline config mux 1002 has separate control values for ingress and egress, and each slot of the mux has its control properly selected based on whether that slot belongs to ingress or egress.

Referring back to FIG. 6, output pipeline registers 1020 and 1022 are shown. These may be clocked every clock cycle, or as is commonly done in the art, they may have their clocks gated to only pulse in desired clock cycles, when data is flowing through the pipeline, and not pulse when there is no valid data to register. Since the ingress and egress pipelines proceed independently, generally the clock cycles where ingress data is present to be registered and the clock cycles where egress data is present to be registered are unrelated. As is standard with registers using gated clocks, there is a control signal to enable the clock. In this system, there are two separate control signals, one for ingress and one for egress. Like the pipeline config mux 1002 of FIG. 10, each slot of the output registers is controlled separately, being given a clock enable signal muxed from the ingress clock enable signal and the egress clock enable signal, where the control of that enable signal mux comes from the packet field ingress egress select vector (not shown).

As a result of the flexible assignment of tables to ingress or egress, the flexible assignment of packet field vector slots to ingress or egress, and the individual control of match and action unit muxes according to ingress or egress dependencies, the two different pipelines of data, ingress and egress, can individually flow through the single multiple stage pipeline unit of FIG. 8. A user definable amount and configuration of table resource can be assigned to each of ingress and egress, a user definable fraction of packet field vector capacity can be assigned to ingress and egress, and the two pipelines of data, ingress and egress, can each flow through the single hardware pipeline block 800 with latencies determined by their own table dependencies, completely independently and without any interaction between ingress and egress.

For example, further above and in FIG. 2 an implementation of Openflow ALL groups was described. It was stated that the egress pipeline 118 contains a table entry for each bucket of each ALL group. If this is the only egress processing, and the resulting ALL group egress flow table fits into a single match and action stage's match memory, it can be instantiated into any of the multiple stages of FIG. 8. All of the stages before and after would have no egress tables, and the egress table dependencies between stages would be set to none, resulting in an egress pipeline like FIG. 5a. The ALL group egress table could be put into any stage, and would be able to use holes in the space of table usage by ingress, allowing co-optimization of table usage between ingress and egress. Its also possible that the ALL group egress table could be split across multiple stages, either because it was too large to fit in a single stage or because the available holes in the table usage by ingress were small and scattered. These separate scattered subtables could be thought of as separate tables, which do no action if no match occurs, other than setting the next table executed to the next physical table used by the egress ALL group table.

Above and in FIGS. 4 and 9 it was described how a single match and action stage contains multiple individual match tables. There are ternary 406 and exact match 404 tables, and each one may be divided bitwise into a multiple of narrower bitwidth tables, for example 4 tables each of ¼ the total bitwidth of the original table. In this example with each of the ternary 406 and exact 404 match tables divided into 4 tables, a total of 8 tables exists per match and action stage. Openflow defines a series of sequential match and action stages, so the individual tables (8 in this example) in the match and action stage must be ordered, typically by numbering them sequentially, for example from 0 to 7. Tables across the different match and action stages in the whole pipeline are also numbered. Such a numbering scheme could use the bottom B bits of a table number to represent one of the 2B tables in a stage, and the top T bits to represent the stage number in a pipeline with 2T stages. In this example with 8 potential tables per stage, a pipeline with 8 stages would have up to 64 tables, and a 6 bit table ID would be used, with the top three bits identifying the stage and the bottom three bits identifying the table within the stage. Those bottom three bits may be referred to as the logical table ID within the stage, the top three bits may be referred to as the stage 1D.

In the above example configuration with 8 tables per stage, the assignment of individual tables to Openflow table ID's must be configurable. The table ID's reflect the ordering of the tables for Openflow processing. This ordering could, for example, be 4 exact match tables followed by 4 ternary tables, or the converse, 4 ternary tables followed by 4 exact match tables, or any other combination interleaving the two types of tables. As a result, any physical table in the match and action stage can receive any Openflow ID index from 0 to 7 representing the bottom B bits of the Openflow table ID, and so the logical ordering of the tables according to this Openflow ID is fully flexible.

Tables in a single match and action stage can be considered to have a physical order, which is simply an index used to reference the physical hardware implementing the table. In the example above with 4 exact match and 4 ternary match tables, the exact match tables might be given the physical indices from 0 to 3, while the ternary match tables might be given the physical indices 4 to 7.

Openflow defines a set of tables which are sequentially numbered, each of which when executed specifies in the actions triggered by its match (or by the default action in case of no match) the index of the next table to execute, a successor table. If table N is executed, and specifies table N+1 as next-table, then table N+1 will be executed. If table N specifies N+2, or any greater table index, or does not specify any table successor, then table N+1 is not executed. Table N+1 is dependent for its execution on the results of table N. It is said that table N+1's execution if predicated on the successor results of table N. All tables with Openflow ID's higher than N+1 are also predicated on the successor results of table N. This is referred to as successor predication.

Generally speaking, to implement this functionality, there will be predication chaining logic where signals flow from tables with lower numbered Openflow ID's to tables with higher number Openflow ID's. The top T bits of the Openflow ID identifies the match and action stage containing the table, and therefore directly corresponds to the hardware. But the bottom B bits of the Openflow table ID identifes the Openflow table within a match and action stage, and as described above, do not correlate directly to physical units of hardware.

The predication chaining logic needs information for each Openflow table describing whether the table was executed, represented by a table-executed signal, and what the Openflow ID of the successor table is, represented by a table-successor field. It also needs to represent the case when the table was executed and the action specified no table successor. There are many equivalent ways to represent this in hardware, but one way to describe this case is to have the table-successor field specify a table with index higher than exists in the hardware. In the above example, with 6 bit table ID's ranging from 0 to 63, a table index of 64 would be used to specify no successor. Adding this 7th bit to the table-successor signal in order to represent a 64 is equivalent to specifying table-successor<6> (bit 6) as representing a no-successor flag.

Figure 11:
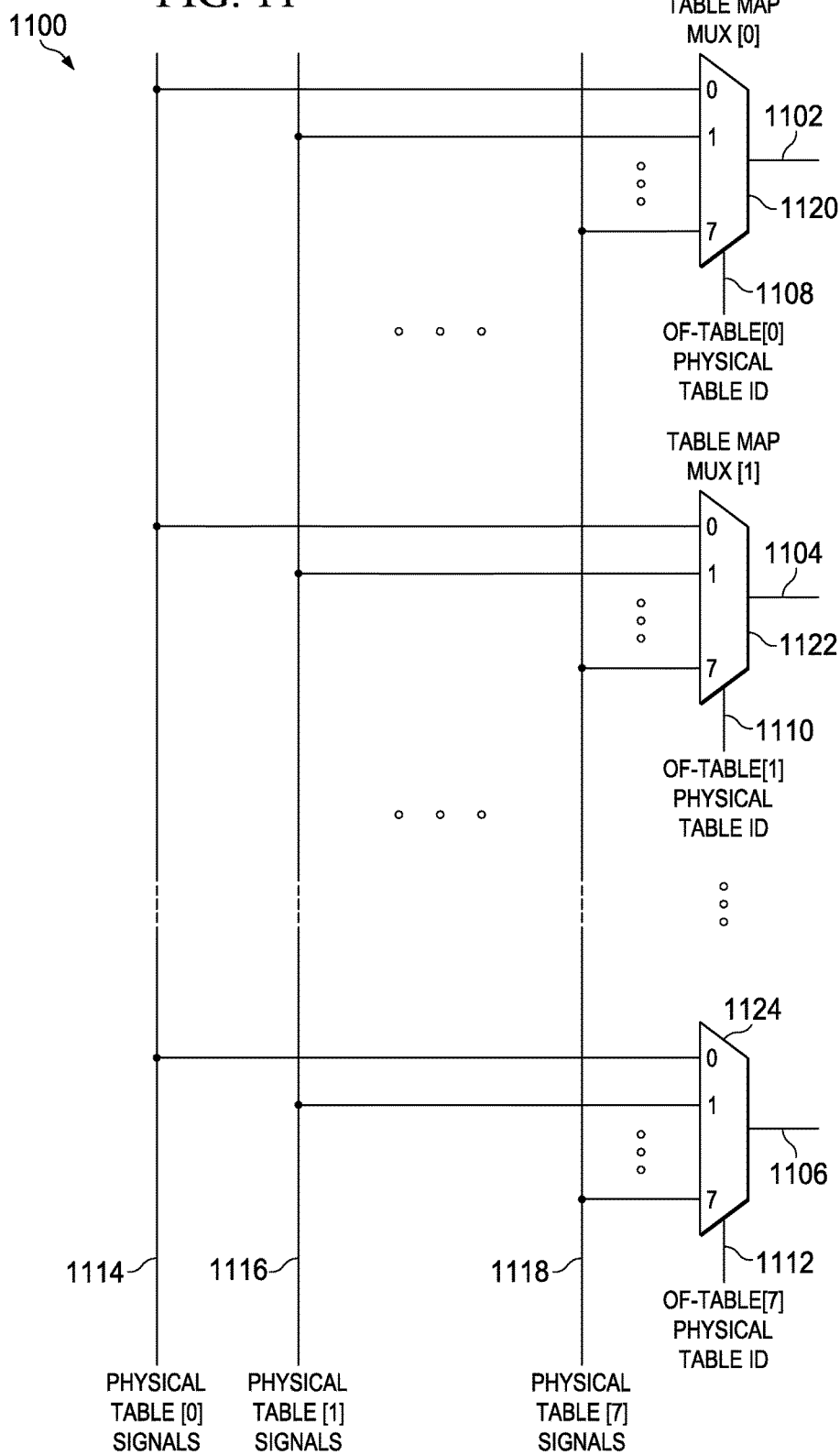
FIG. 11 is an electrical diagram, in block form, of logic used to map physical table signals to logical OpenFlow table signals according to embodiments of the invention.

Since tables exist in a hardware stage with a physical index, but predication chaining uses the OpenFlow logical ID bottom B bits, the first function of the logic is to map physical table signals 1114-1118 to OpenFlow logical table signals 1102-1106. Here, logical tables within a stage are the same tables, sorted in order of their OpenFlow ID bottom B bits. The logic which maps physical table signals 1114-1118 to logical OpenFlow table signals 1102-1106 is shown in FIG. 11. For each OpenFlow logical table I from 0 to 7, there is a configuration register signal of-table[I]-physical-table-id 1102-1106, containing values identifying which physical table is mapped to that OpenFlow logical table. For example, if 8 physical tables had OpenFlow ID's (within the stage) of 0,4,7,5,6,3,2,1 the 8 OF of-table[I]-physical-table-id registers 1102-1106 would have values 0,7,6,5,1,3,4,2. For example, of-table[1]-physical-table-id would have value 7, because it is physical table 7 which maps to OpenFlow table 1. In the logic of FIG. 11, these 8 of-table[I]-physical-table-id registers 1102-1106 each control a multiplexer 1120-1124 outputting signals creating their respective OpenFlow table signals, where the multiplexer inputs are the signals from the 8 physical tables 1114-118. In the above example, of-table[1]-physical-table-id with value 7 would cause tablemapmux[1] 112 to choose the signals from physical table 7 to map to OpenFlow table 1 signals. This group of muxes 1120-1124 is called the table-map-crossbar.

Once the physical table output signals 114-1118 are mapped through the logic of FIG. 11, they are in OpenFlow logical table order. In the rest of the description, table indices refer to Openflow ID's rather than physical indices, and are assumed to use signals which have been gone through the table-map-crossbar.

Again considering the example above with 8 tables in a match-action stage, there are 8 versions of the table-successor and table-executed signals. For table I from 0 to 7, these signals will be named table-executed[I] and table-successor[i]<6:0>, where <6:0> represents that the signal is a vector of 7 bits with bit indices from 6 downto 0. Here bit 0 is the lsb. The table-successor signals come from the action logic as a result of a match or lack thereof. The table-executed signals have to be produced in a chain of logic where the table-executed signal for any table is dependent on the table-executed signals of prior tables.

The logic equation to represent that table 1 is executed, dependent on table 0's result is:

table-executed[1]=/table-executed[0]+(table-successor[0]<=1)

where the / in front of a signal means a logical not (/xxx=(not xxx)).

The equation for execution of table 2 is:

table-executed[2] = (/table-executed[0] + (table-successor[0] <= 2))
    (/table-executed[1] + (table-successor[1] <= 2))

where the logic equation representation (a b) means (a and b), so both terms have to be true for table-executed[2] to be true.

The equation for execution of table 3 is:

table-executed[3] = (/table-executed[0] + (table-successor[0] <= 3))
    (/table-executed[1] + (table-successor[1] <= 3))
    (/table-executed[2] + (table-successor[2] <= 3))

In general, each successive table includes another AND term. The equation for table-executed[3] reflects the fact that table 0 can turn off table 3's execution, table 1 can, and table 2 can also turn it off. Table 63 would have a logic equation with 63 AND term inputs, from tables 0 through 62, reflecting that any of them could turn off table 63's execution.

In practice, this logic can be modularized. A single stage has, in this example, 8 tables. The information it receives from previous stages is simply a starting Openflow table ID. The last prior table (in previous stages) which executed provides this table ID with its table-successor field. This start-adr specifies a match and action stage with its top T bits, and which table within a stage with its bottom B bits, and can represent no table successor with an additional msb (bit 6 in this example). So including the logic of the start-adr ID, the equations for table-executed[0] through [3] in stage [stage] are:

tbl-executed[0] =
  (start-adr<2:0> <= 0)(start-adr<6:3> <= [stg])
tbl-executed[1] =
  (start-adr<2:0> <= 1)(start-adr<6:3> <= [stg])
  (/tbl-executed[0] + (tbl-sucssr[0]<2:0> <= 1)
  (tbl-sucssr[0]<6:3> <= [stg]))
tbl-executed[2] =

-continued

```
    (start-adr<2:0> <= 2)(start-adr<6:3> <= [stg])
    (/tbl-executed[0] + (tbl-sucssr[0]<2:0> <= 2)
    (tbl-sucssr[0]<6:3> <= [stg]))
    (/tbl-executed[1] + (tbl-sucssr[1]<2:0> <= 2)
    (tbl-sucssr[1]<6:3> <= [stg]))
tbl-executed[3] =
    (start-adr<2:0> <= 3)(start-adr<6:3> <= [stg])
    (/tbl-executed[0] + (tbl-sucssr[0]<2:0> <= 3)
    (tbl-sucssr[0]<6:3> <= [stg]))
    (/tbl-executed[1] + (tbl-sucssr[1]<2:0> <= 3)
    (tbl-sucssr[1]<6:3> <= [stg]))
    (/tbl-executed[2] + (tbl-sucssr[2]<2:0> <= 3)
    (tbl-sucssr[2]<6:3> <= [stg]))
```

To implement this logic, a useful module is an inverse thermometer decoder. A thermometer decoder inputs an N bit number, and outputs a 2\*\*N bit vector, where for any value V of the N bit input number, bits V and lower are 1, and bits V+1 and higher are 0. A truth table showing its function is below:

| input | 0 1 2 3 4 5 6 7 |
|---|---|
| output bit 7 | 0 0 0 0 0 0 0 1 |
| 6 | 0 0 0 0 0 0 1 1 |
| 5 | 0 0 0 0 0 1 1 1 |
| 4 | 0 0 0 0 1 1 1 1 |
| 3 | 0 0 0 1 1 1 1 1 |
| 2 | 0 0 1 1 1 1 1 1 |
| 1 | 0 1 1 1 1 1 1 1 |
| 0 | 1 1 1 1 1 1 1 1 |

An inverse thermometer decoder (which will henceforth be named THX) as described here inputs an N bit number, and outputs a 2\*\*N bit vector, where for any value V of the N bit input number, bits V and higher are 1, and bits V−1 and lower are 0. A truth table showing its function is below:

| input | 0 1 2 3 4 5 6 7 |
|---|---|
| output bit 7 | 1 1 1 1 1 1 1 1 |
| 6 | 1 1 1 1 1 1 1 0 |
| 5 | 1 1 1 1 1 1 0 0 |
| 4 | 1 1 1 1 1 0 0 0 |
| 3 | 1 1 1 1 0 0 0 0 |
| 2 | 1 1 1 0 0 0 0 0 |
| 1 | 1 1 0 0 0 0 0 0 |
| 0 | 1 0 0 0 0 0 0 0 |

The application of an inverse thermometer decoder to the table predication problem is simply that given a code representing a table-successor, a THX module at its output provides a map of which tables are enabled vs disabled by the table-successor code value.

In this example with 8 tables per stage, if the table-successor<2:0> field, (which specifies which table in a stage is the next-table), is input to an inverse thermometer decoder, the 8 bit output specifies on each of its output bits, whether that table in the stage is enabled or disabled by the table-successor field. All of the terms in the above logic equations for table-executed[0] to [3], as well as the not shown ones for table-executed[4] to [7], which involve arithmetic comparisons of a table-successor[I] to a constant value, may be implemented using inverse thermometer decoders, referred to as THX units. In addition, the top T bits of the table-successor fields must indicate that the table successor is in the same match stage. The terms in the avove equations for table-executed[0:3] include (table-successor[I]<6:3><=[stage]) to express this.

The same match stage qualification can be thought of as an enabling term for all output bits of the THX blocks. Furthermore, since a table can't output a successor on an earlier row, (table-successor[I]<6:3><[stage]) is not possible, so the <=comparison can be changed to an = comparison. The enabling term can be thought of a function which can force all outputs to zero.

In the above equations for table-executed[0:3] above, if a table is not executed, it can't force the disabling of any future table. That is accomplished by the or'ing of /table-executed[I] in each and term. This can be thought of as a function which forces all THX outputs to 1.

Designing the logic for thermometer decoders, THX blocks, and THX blocks with enables is easily done by those skilled in the art.

Figure 12:
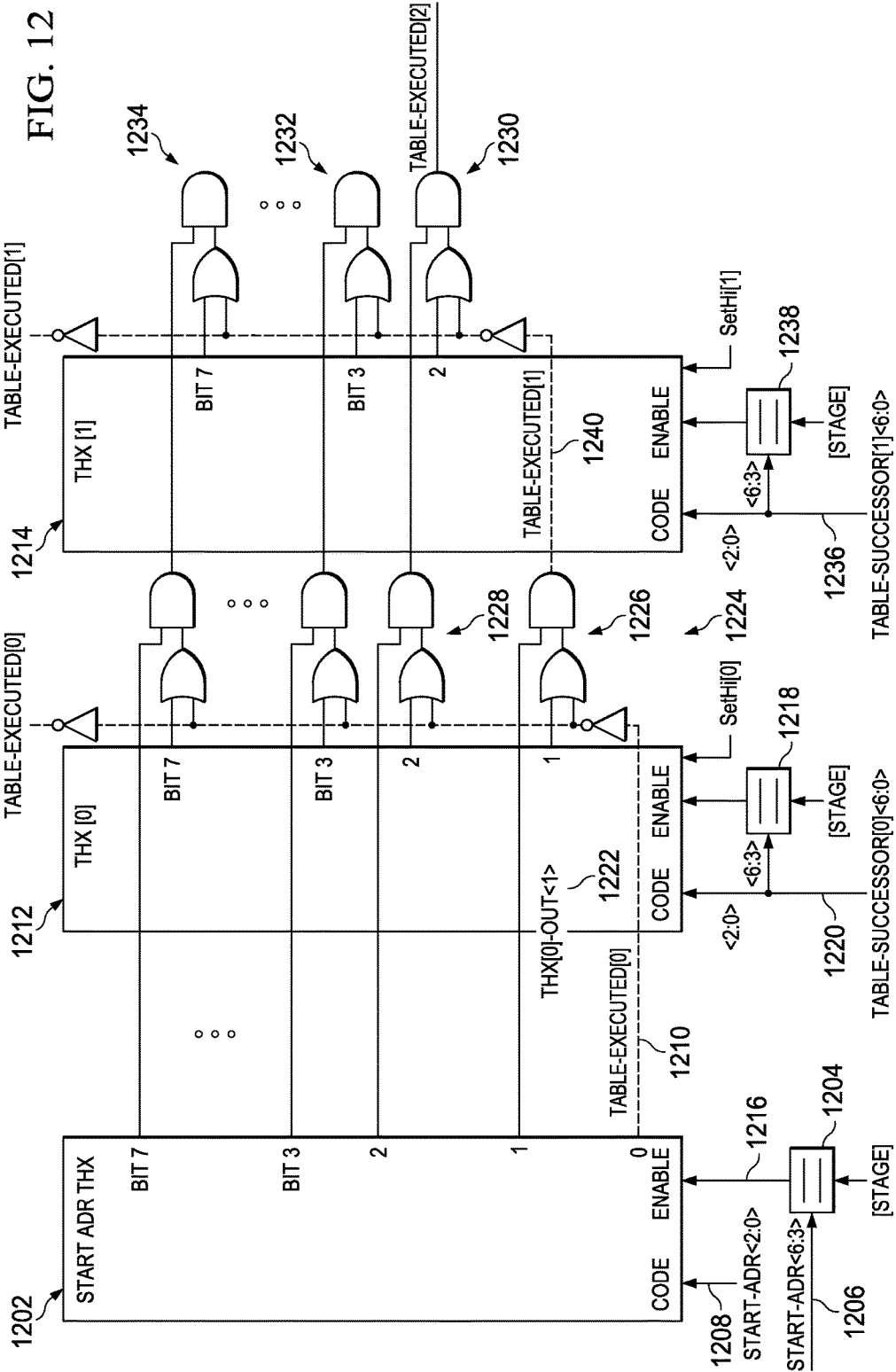
FIG. 12 is an electrical diagram, in block form, of logic implementing the first stages of iterative predication between successive tables in a stage according to embodiments of the invention.

FIG. 12 shows a partial logic diagram, implementing the first stages of iterative predication chaining logic between successive tables in a stage. On the left, the start-adr-thx block 1202 is a THX block with enable, which on its 3 bit code input accepts the start-adr<2:0> bits specifying which table in the stage is the first one to execute. Additionally, start-adr-stage-comparator 1204 checks that the start-adr msbs, bits <6:3> 1206 specify that the start-adr is in the stage this hardware resides in. It is supplied a [stage] constant for the comparison. If the equal comparison fails, the start-adr-thx block 1202 outputs all zeroes, which will disable all table-executed signals in this stage. If enabled, the THX block outputs 1's starting with the address specified by start-adr<2:0> 1208 and higher bits, which will enable table execution for the table specified by start-adr<2:0> and all later tables in the stage.

The start-adr<6:0>1206 and 1208 is the only qualifier for execution of the first table, table[0], so table-executed[0] 1210 is a direct output of bit 0 of the start-adr-thx block 1202. Note from the above truth table for a THX module 1212-1214 that bit 0 is always true. So the only logic contributing to table-executed[0] 1210 is the start-adr-thx enable input 1216 from the start-adr-stage-comparator 1204.

A second THX block THX[0] 1212 with comparator table[0]-comp 1218 is similarly configured to start-adr-thx, but instead of taking start-adr<6:0> as input, it takes table-successor[0]<6:0>. The signal table-successor[0]<6:0> 1220 is provided as its input, but at that signal it is not yet known whether table[0] is actually executing, or is disabled by earlier gating, specifically by a start-adr<6:0> 1220 representing a table higher in index than table[0]. So table-successor[0]<6:0> 1220 can be considered a speculative signal. The THX[0] block 1212 outputs its inverse thermometer code, from bits 7 downto 1 (bit 0 would be unused), which represent the enabling or disabling of the higher tables 7 to 1 just from the effects of table[0] execution. For example, bit 1 output of THX[0] 1212 represents its enabling of table[1]. There are two additional considerations to produce the final enabling of table[1]. First, if table[0] is not executed, the disabling effect of THX[0]-out<1> must be disregarded. The signal table-executed[0] 1210 represents whether table[0] is executed. It goes to inverter table[0]-exec-inv 1224, whose output is OR'ed with THX[0]-out<1>1222 in OR/AND logic gate oa[0]<1> 1226. So when table[0] is not executed, the output of inverter table[0]-exec-inv 1224 is high, forcing the output of the or portion of gate oa[0]<1> 1226 to a 1. The second condition for table[1] to be executed is that it is not disabled by start-adr-thx 1202. The AND term input to oa[0]<1> coming from bit 1 output of start-adr-thx accomplishes this. So the output of gate oa[0]<1> 1226 represents the full logic of enabling table[1], and so produces the signal table-executed[1].

THX[0] 1212 has an additional input sethi[0] which can set all the output bits of THX[0] 1212 to one. This is used to turn off any masking effects of THX[0], for example, if table[0] is not used in the system and table-successor[0] doesnt' contain valid data.

Similarly to the bit 1 output of thx[0] 1212, the bit 2 output of thx[0] 1212 represents the enabling of table[2] (instead of table[1]) by the action of table[0]. It goes to a logic gate oa[0]<2> 1228 which performs the same function for table[2] which oa[0]<1> 1224 did for table 1, forcing its enablement if table[0] is not executed, then qualifying that by enablement from start-adr-thx 1202 output bit 2. This, however, is not yet the full enablement of table[2], since it still has to factor in effects from table[1].

Similarly to output bits 1 and 2 of thx[0] 1212, bits 3 through 7 go to oa (or-and) gates factoring in the effects of enablement of table[0] and enablement by start-adr. Similarly to the bit 2 output of thx[0] 1212 the oa gates' outputs for higher bits only factor in the effects of table[0] and will have to factor in the effects of further tables to produce final table-executed signals for higher tables.

To produce the final enablement of table[2], one more stage is needed, including the inverse thermometer decoder block thx[1] 1214 and a vector of oa gates 1230, 1232 and 1234 on its output bits 2 through 7. Though not shown in the figure, there are thx blocks [2] through [6] continuing in sequence, accepting inputs table-successor[2] through [6], driving oa gates on each bit output, and producing output signals table-executed[3] through [7]. Each THX[I] block from [2] through [6] outputs its code on bits I+1 through 7, with the lower bits being unused.

Figure 13:
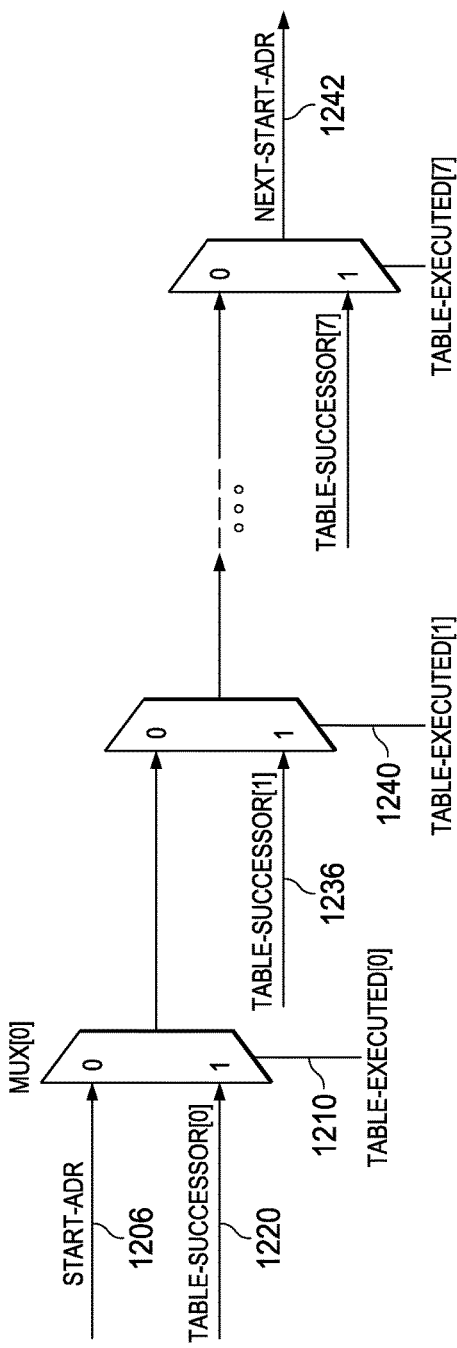
FIG. 13 is an electrical diagram, in block form, illustrating a multiplexer chain, where at each stage of the chain the previous next-table is passed through when the table was not executed according to embodiments of the invention.

The logic in FIG. 7, when extrapolated to include THX blocks from [0] to [6], produces table-executed[0] to [7] signals, reflecting the predicated enabling of all tables in the stage. It accepts a start-adr<6:0> input signal from a previous match and action stage, and uses the logic of FIG. 13 to produce that signal for the subsequent stage. According to OpenFlow operation, given a series of flow tables, if execution has proceeded up through some particular table N, where each table before that may or may not have been executed, the last table which was actually executed carries the next table address. In the example with 8 tables each in 8 stages, if tables 0 through 3, the first 4 tables in the first stage are executed, with table 3 having as its next-table table number 24, it is easy to see that stage[0] outputs 24 as its next table ID, stage[1] containing tables 8 through 15 also outputs 24 as its next table id, as does stage[2] which contains tables 16 through 23. Stages 1 and 2 pass the next-table information through, while stage[0] outputs the next-table of its last executed table, table[3]. FIG. 13 shows a multiplexer chain, where at each stage of the chain, the previous next-table is passed through if the table was not executed, and the next-table value represented by the table-successor signal is output if that table was executed. In this case, the table-executed[0] 1210 through [7] input signals are those produced by the logic of FIG. 12, and the table-successor[0] 1220 through [7] input signals are the same signals as those of the same name in FIG. 12.

Typically, between match and action stages there may be a transport delay, resulting in the incorporation of pipeline registers between stages as indicated in FIG. 6. Pipeline registers are also then inserted between match and action stages for the next-start-adr signal 1242. Pipeline registers between every stage produce the pipeline configuration shown in FIG. 5c, where the operation of every stage is delayed by a single clock cycle. While FIG. 5c illustrates a generalized delay between stages, it was previously described that a single set of pipeline registers between stages causes the pipeline delay of FIG. 5c to be a single clock cycle per stage.

As a result of examining the pipeline diagram of FIG. 5c, it is apparent that no matter what predicated successor dependencies exist between OpenFlow tables, that pipeline schedule can be achieved. That schedule is the one described as the schedule with no dependencies between stages, as opposed to the match and action dependencies of FIGS. 5a and 5b respectively. This provides detailed explanation of the previous statements that successor dependencies between tables incur no additional pipeline delays and can be scheduled the same way as tables with no dependencies.

It was stated earlier that the purpose of the transport delay illustrated in FIG. 5 and allowed for by the incorporation of the pipeline registers shown in FIG. 6 is to provide time for signals to travel the physical distance between successive match and action stage blocks in an implementation. At first glance it would seem that no similar provision has been made for the predication chaining logic, since there are a substantial number of delay-consuming gates in the critical path of each clock cycle. However, there are only a small number of predication chaining signals between stages, only the next-start-adr, so it is easily possible to wire those signals with a wider pitch or on a thicker metal layer, reducing delay. Such techniques are well known to those skilled in the art of IC design.

Figure 14:
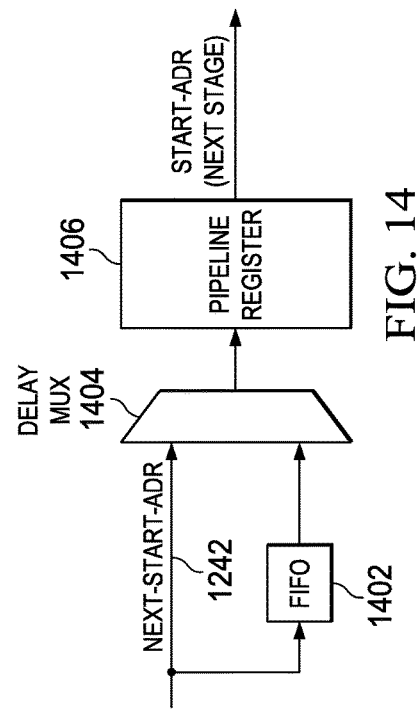
FIG. 14 is an electrical diagram, in block form, illustrating circuitry for implementing the pipeline configurations in FIGS. 5a and 5b according to embodiments of the invention.

While the single stage of pipeline registers in FIG. 13 allows for the pipeline timing configuration of FIG. 5c, other pipeline configurations such as those shown in FIGS. 5a and 5b must also be provided for. The logic of FIG. 14 accomplishes this. A FIFO (first in first out) module 1402 is inserted before the pipeline register. A FIFO is a module which can create a programmable number of clock cycles of delay from input to output. These configurable delays can match the delay between stages seen in FIGS. 5a and 5b. The FIFO delay can be eliminated by a configuration which switches the input of the delay-mux 404 to the opposite input, thus driving the pipeline register 1406 input directly from next-start-adr.

Figure 15A:
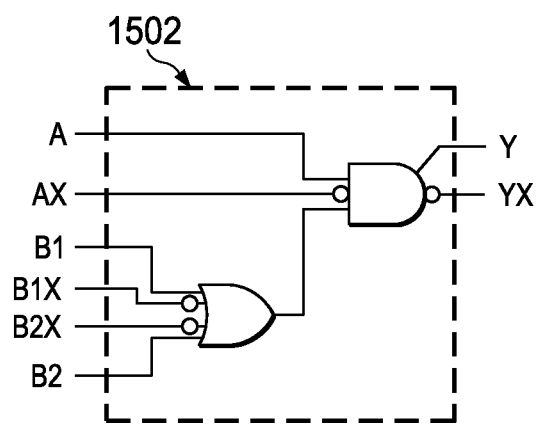
FIG. 15a is an electrical diagram illustrating a dual-rail or/and logic gate according to embodiments of the invention.
Figure 15B:
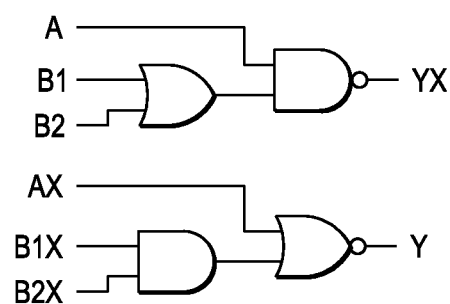
FIG. 15b is an electrical diagram illustrating dual-rail or/and logic gate according to embodiments of the invention.

The logic implementation of FIG. 12 still has a substantial delay from input to output; there is a noninverting or-and gate delay per table in each stage. This delay can be reduced from two logic inversion of delay per table to one logic inversion per table using dual-rail static logic. Dual rail static logic represents each logic signal with two physical signals of opposite logic polarity. Each dual-rail logic gate inputs dual-rail signals on each logical input and produces dual-rail output signals. With both signal polarities available, extra delays for logic inversions are eliminated. A conceptual diagram of a dual-rail or-and gate 1502 is shown in FIG. 15a, with the actual logic implementation shown in FIG. 15b. While this is only shown for the or-and gates used in FIG. 12, those skilled in the art can easily produce a realization of the full logic in a dual-rail static version. There are some portions of the logic, for example the THX[0] through [6] which aren't on critical timing paths so don't require dual-rail internal implementations, simply producing dual-rail outputs with an additional inverter driven by the single-rail output.

Earlier it was described how the match and action pipeline can be dual-threaded, where some of the match tables belong to ingress and the others belong to egress. The predication chaining logic can easily be extended to handle that functionality. There are two separate copies of the logic in FIGS.

11, 12, and 13, producing separate table-executed signals and separate next-start-adr signals for ingress and egress. The sethi[0] through [7] signals are provided with separate copies for ingress and egress. If a table[i] is not used for ingress (possibly because its used for egress), its ingress version of sethi[i] is set to 1, forcing the outputs of the ingress version of the thx[i] block to a 1. Likewise, if a table[i] is not used for engress (possibly because its used for ingress), its engress version of sethi[i] is set to 1, forcing the outputs of the ingress version of the thx[i] block to a 1. It is possible to use one copy of some of the logic, such as the start-adr-stage-comparators 1204, 1218 and 1238, and table [0]-comp through table[7]-comp. It is also possible to use a single copy of the THX[0] 1212 through [7] blocks up to the point where the signals have to be separately forced to 1 by the ingress and egress sethi inputs.

The above descriptions have used as example particular values for the number of tables in a stage and the number of stages. These are in no way meant to be limiting. It is readily apparent to those skilled in the art how to generalize the logic to different number of stages or different numbers of tables per stage. Other specifics in the description are also in no way meant to be limiting, as they can be easily be generalized by those skilled in the art.

The system has been described using exact and ternary match tables, but the inventive description should not be interpreted as being limited to those table types. Additional table types, such as range matching TCAM and longest prefix match are also possible.

The foregoing description has been presented for purposes of illustration and description. It is not intended to be exhaustive or to limit the invention to the precise form disclosed, and other modifications and variations may be possible in light of the above teachings. The embodiments were chosen and described in order to best explain the applicable principles and their practical application to thereby enable others skilled in the art to best utilize various embodiments and various modifications as are suited to the particular use contemplated. It is intended that the appended claims be construed to include other alternative embodiments except insofar as limited by the prior art.

What is claimed is:

1. A packet processing pipeline comprising:
   a plurality of match and action stages, wherein each match and action stage in the plurality of match and action stages incurs a match delay when match processing occurs; wherein each match and action stage in the plurality of match and action stages incurs an action delay when action processing occurs; wherein a transport delay occurs between successive match and action stages in the plurality of match and action stages when data is transferred from a first match and action stage to a second match and action stage in the successive match and action stages;
   wherein each match and action stage of the plurality of match and action stages comprises:
   a first crossbar;
   an exact match table coupled to the first crossbar;
   a second crossbar;
   a ternary match table coupled to the second crossbar;
   an action memory coupled to the exact match table and the ternary match table; and
   an action processor coupled to the action memory.

2. The packet processing pipeline of claim 1 wherein the successive pair of match and action stages have a first field modified by the first match and action stage wherein the modified first field is used as a match field by the second match and action stage.

3. The packet processing pipeline of claim 1 wherein the successive pair of match and action stages have a second field modified by the first match and action stage wherein the modified second field is used as data input to an action by the second match and action stage.

4. The packet processing pipeline of claim 1 where the successive pair of match and action stages have a table successor dependency between the first match and action stage and the second match and action stage.

5. The packet processing pipeline of claim 1 wherein a first time delay between the first and the second match and action stages is approximately equal to the sum of the match delay, the action delay and the transport delay when match processing occurs between the first and the second match and action.

6. The packet processing pipeline of claim 1 wherein a second time delay between the first and the second match and action stages is approximately equal to the sum of the action delay and the transport delay when action processing occurs between the first and the second match and action stages and no action processing occurs between the first and the second match and action stages.

7. The packet processing pipeline of claim 4 wherein a third time delay between the first and the second match and action stages is approximately equal to the transport delay when the table successor dependency occurs between the first and the second match and action stages, no action processing occurs between the first and the second match and action stages and no match processing occurs between the first and the second match and action stages.

8. The packet processing pipeline of claim 1 wherein a fourth time delay between the first and the second match and action stages is approximately equal to the transport delay when no table successor dependency occurs between the first and the second match and action stages, no action processing occurs between the first and the second match and action stages and no match processing occurs between the first and the second match and action stages.

* * * * *